United States Patent
Thornberg

(10) Patent No.: US 11,663,616 B2
(45) Date of Patent: May 30, 2023

(54) OPTIMIZED BATCHED POLYTOPE PROJECTION

(71) Applicant: Chicago Mercantile Exchange Inc., Chicago, IL (US)

(72) Inventor: Carl Erik Thornberg, Stockholm (SE)

(73) Assignee: Chicago Mercantile Exchange Inc., Chicago, IL (US)

( * ) Notice: Subject to any disclaimer, the term of this patent is extended or adjusted under 35 U.S.C. 154(b) by 28 days.

(21) Appl. No.: 16/578,836

(22) Filed: Sep. 23, 2019

(65) Prior Publication Data

US 2021/0019774 A1    Jan. 21, 2021

Related U.S. Application Data

(60) Provisional application No. 62/875,263, filed on Jul. 17, 2019.

(51) Int. Cl.
| | | |
|---|---|---|
| *G06Q 30/02* | (2012.01) | |
| *G06Q 40/04* | (2012.01) | |
| *G06Q 40/06* | (2012.01) | |
| *G06Q 30/0202* | (2023.01) | |
| *G06Q 30/0201* | (2023.01) | |

(52) U.S. Cl.
CPC ..... *G06Q 30/0202* (2013.01); *G06Q 30/0201* (2013.01); *G06Q 40/04* (2013.01); *G06Q 40/06* (2013.01)

(58) Field of Classification Search
None
See application file for complete search history.

(56) References Cited

U.S. PATENT DOCUMENTS

| | | | |
|---|---|---|---|
| 8,156,038 B2 | 4/2012 | Brouwer | |
| 8,301,552 B2 | 10/2012 | Brouwer | |
| 2011/0276460 A1* | 11/2011 | Brouwer | G06Q 10/0637 705/37 |

(Continued)

FOREIGN PATENT DOCUMENTS

EP      1232461 A1    8/2002

OTHER PUBLICATIONS

Balevic et al. ; Scaling Data-Intensive Applications on Heterogeneous Platforms with Accelerators, Date of Conference: May 21-25, 2012, IEEE (Year: 2012).*

(Continued)

*Primary Examiner* — Chesiree A Walton
(74) *Attorney, Agent, or Firm* — Lempia Summerfield Katz LLC

(57) ABSTRACT

The disclosed embodiments relate to systems and methods calculation of an estimation solution for a constraint polytope. The apparatus may include a database, a communication interface, and a polytope controller. The database stores data indicative of a constraint polytope. The communication interface is configured to receive a first point batch from an external computer system, and the first point batch includes a plurality of data points representing transactions. The polytope controller analyzes the plurality of data points and performs a projection of the plurality of data points to the constraint polytope and generates a dynamic adjustment for a second point batch for the constraint polytope.

18 Claims, 11 Drawing Sheets

(56) References Cited

U.S. PATENT DOCUMENTS

| | | | |
|---|---|---|---|
| 2012/0127893 A1* | 5/2012 | Binder | H04L 49/101 370/255 |
| 2012/0303509 A1 | 11/2012 | Brouwer | |
| 2014/0006243 A1 | 1/2014 | Boudreault et al. | |
| 2014/0081820 A1* | 3/2014 | Farabi | G06Q 40/04 705/37 |
| 2014/0201191 A1* | 7/2014 | Karmarkar | G06F 16/248 707/722 |
| 2015/0127516 A1 | 5/2015 | Studnitzer et al. | |
| 2017/0091756 A1* | 3/2017 | Stern | G06Q 20/367 |
| 2018/0108086 A1* | 4/2018 | Jang | G06Q 40/04 |

OTHER PUBLICATIONS

Chan et al, Efficient k-means++ with random projection, May 1, 2017, IEEE, 2017 International Joint Conference on Neural Networks (IJCNN) (pp. 94-100) (Year: 2017).*

Tobon et al., Adapting polytopes dimension for managing degrees of freedom in tolerancing analysis, 14th CIRP Conference on Computer Aided Tolerancing (CAT), May 2016, Gothenburg, Sweden (Year: 2016).*

Prusa et al. Center for Machine Perception, Faculty of Electrical Engineering, Czech Technical University, Proceedings of the IEEE Conference on Computer Vision and Pattern Recognition (CVPR), 2013, pp. 1738-1743 (Year: 2013).*

Wasson et al, "Hardware Based Projection onto The Parity Polytope and Probability Simplex", 2015 49th Asilomar Conference on Signals, Systems and Computers; ; Nov. 2015 (Year: 2015).*

Chan et al, Efficient k-means++ with random projection, May 1, 2017) (Year: 2017).*

Bieling et al., "An Efficient GPU Implementation of the Revisied Simplex Method", Parallel & Distributed Processing Workshops and PHD Forum, 2010 IEEE International Symposium, Apr. 19, 2010.

Charlton et al., "Two-Dimensional Batch Linear Programming on the GPU", arxiv.org, Feb. 13, 2019.

Extended European Search Report, from EP Application No. 20184573, dated Dec. 17, 2020, EP.

Gabldullina, "Solving of a Projection Problem for Convex Polyhedra Given by a System of Linear Constraints", 2017 Constructive Nonsmooth Analysis and Related Topics, IEEE, May 22, 2017.

Gurung, et al., "Simultaneous Solving of Batched Lniear Programs on a GPU", Proceedings of the 2019 ACM/SPEC International Conferences on Performance Engineering, Apr. 4, 2019.

Examination Report from European Patent Application No. 20 184 573.2, dated Apr. 4, 2022, 6 pages.

* cited by examiner

OPTIMIZED BATCHED POLYTOPE PROJECTION

CROSS-REFERENCE TO PRIORITY APPLICATION

This application claims priority benefit of Provisional Application No. 62/875,263 filed Jul. 17, 2019, which is hereby incorporated by reference in its entirety.

BACKGROUND

In the technological field of computer science, approximation algorithms calculate solutions to optimization problems in which a difference between the solutions and the optimal solution can be calculated to a certain degree of certainty. Linear programming may use an approximation algorithm to maximize or minimize a linear variable as applied to a particular quantity such as an output using one or more linear constraints. Linear programming may be applied to NP hard optimization problems in which a solution can be verified quickly but cannot be solved quickly. Using time complexity theories for the amount of time required for running the approximation algorithm, it is determined how close the optimal solution may be determined within the bounds of polynomial time.

Approximation algorithms may be applied to relatively simple systems efficiently. An example includes the diet problem where a set of foods are defined each having different nutritional value and a different cost, and an algorithm may select the best foods for the diet according to constraints. However, as the number of variables and the number of constraints become much higher, the time complexity of the solutions render the algorithm impractical in some applications. Instead, an approximation algorithm may not return "exact" solutions but reduce the time complexity of the solutions. The following embodiments present approximation algorithm techniques that render solutions quickly with a high number of variables and linear constraints, which may be handled in any time optimization.

DETAILED DESCRIPTION

Figure 1A:
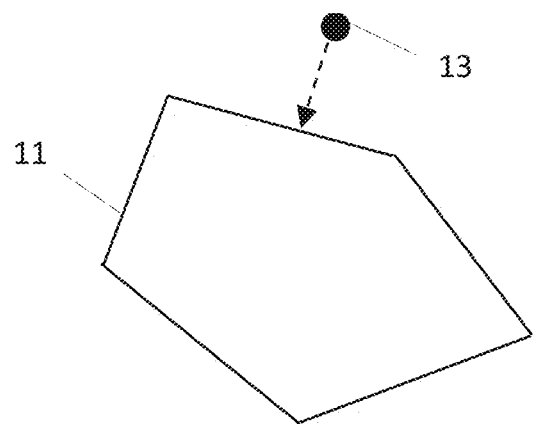
FIG. 1A depicts an example projection for quadratic programming.

Linear programming includes maximizing or minimizing a linear function based on linear constraints. A linear programming technique optimizes a function under one or more constraints defined according to one or more linear equalities and/or one or more linear inequalities. When represented geometrically or spatially, the region describing the solutions is a convex polytope. The polytope may be the intersection of spaces limited by the one or more linear equalities and/or the one or more linear inequalities. Using two-dimensional space for ease of illustration, FIG. 1A depicts an example polytope 11 as a pentagon or five-sided polygon having five sides defined according to five inequalities. Other examples may be n-dimensional where n is any number or integer. That is, rather than polytope 11 which is 2-dimensional, a polytope may be three-dimensional, four-dimensional, or a larger dimension.

The term "polytope" may be defined to include all convex, geometric objects with flat surfaces even though they are not solid, for example if a single line divides a two-dimensional space in two, the feasible side may be referred to as a polytope. Furthermore, the following embodiments handle linear dimension reductions freely in the polytope projection functionality.

Projecting one point (e.g., point 13 in FIG. 1A) to the closest point within a polytope amounts to solving a quadratic programming problem with standard algorithms, but this method is not adaptive, applies to one point at a time and does not normally include allowed imperfection.

Figure 1B:
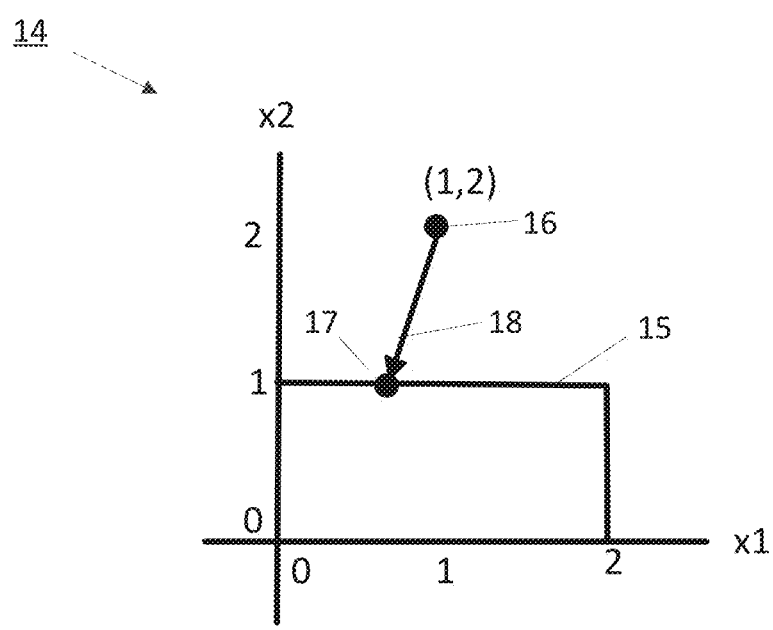
FIG. 1B depicts an example distance calculation for quadratic programming.

FIG. 1B illustrates a graph 14 of another example polytope. The graph includes a polytope 15 having two dimensions, x1 and x2. The polytope 15 is defined by the inequalities $x1>0$, $x1<2$, $x2>0$ and $x2<1$. A point 16 outside of the polytope 15 is at $x1=1$, $x2=2$. A calculation to move the point according to arrow (vector) 18 so that the result, point 17, is on or within the polytope 15. To find the closest point to the starting point 16 the length of the vector 18 is minimized. The distance for minimization may be calculated for example using $sqrt((1-x1)^2+(2-x2)^2)$, where $(x1,x2)$ are the coordinates of the point 17. Since optimizing a square root is the same as optimizing what is within the square root, the calculation simplifies to the optimization of $(1-x1)^2+(2-x2)^2$ subjected to $x1>0$, $x1<2$, $x2>0$, $x2<1$, which when expanded yields an expression with linear and quadratic terms in x1 and x2 subjected to linear constraints in x1 and x2, which is a quadratic programming problem. By inspection, the solution in the graph 14 of FIG. 1B is (1,1).

Figure 2:
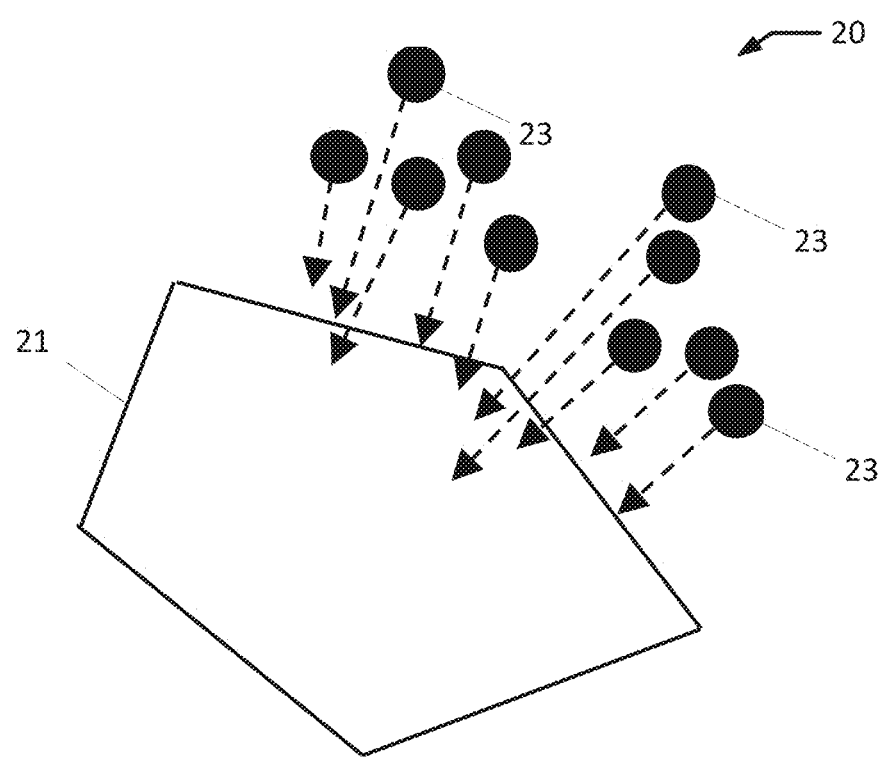
FIG. 2 depicts an example of batch projections.

FIG. 2 includes a batch projection 20 of multiple points 23 to a polytope 21. The batch projection 20 enables the projection of multiple data points to a polytope in parallel, using the same instructions (apart from time-insignificant diagnostic procedures) for all points simultaneously in an iterative manner until the fail rate of points is acceptable. If a polytope is used to constrain the solution space in evolutionary optimization, a strategy is to penalize data points outside of the polytope with the goal of steering the points towards the polytope over many iterations of the optimization. However, the embodiments disclosed herein instead project the data points to within the polytope in every optimization iteration. This solves the problem of projecting large quantities of data points to a polytope in any given dimension. The objective is not to find the mathematical optimal projection for each point, but to maximize throughput by accepting a reasonable imperfection in projection precision, in terms of optimality and feasibility, and an acceptable fail rate of points, that is a fraction of the data points will not be projected properly.

One application for batch projections is a polytope defined by trade constraints for the determination of a margin requirement. A client may submit trades along with trade constraints. One margin requirement, an initial margin (IM), is the amount of collateral funds required to open a position as required by a particular entity. The entity may be an exchange or clearinghouse that clears trades and requires traders to maintain performance bonds in margin accounts to cover risks associated with the portfolios. The clearinghouse (e.g., central counterparty to financial products) may use the performance bond to counter margin risk associated with the portfolio. Risks may utilize complex algorithms to be analyzed to determine required initial margin amounts and maintenance margin amounts.

Alternatively, the particular entity may be a governing body that sets regulations for market participants that engage in over the counter (OTC) instruments or derivatives with one another without clearing. One example governing body is described by the Standard Initial Margin Model (SIMM) that describes requirements or constraints for these uncleared contracts between market participants. Another example governing body is the International Swaps and Derivatives Association, Inc. (ISDA).

The initial margin is the total amount of margin (per contract or in aggregate) required by the entity when a position is opened. A drop in funds below this level requires a deposit back to the initial margin levels, i.e., a performance bond call. A performance bond call, also referred to as a margin call, is a demand for additional funds to bring the account back up to the initial performance bond level whenever adverse price movements cause the account to go below the maintenance.

Example contracts may include a currency forward, an interest rate swap, a credit default swap (CDS), and an interest rate swaption. The example contracts available may be limited to those contract that contribute to the initial margin requirements. For example, some margin requirements are not impacted by specific contract types.

A currency forward locks in an exchange rate for the purchase (and sale) of a currency on a future date. An interest rate swap involves the exchange of one stream of future interest payments for another based on a principal amount. Interest rate swaps may involve the exchange of a fixed interest rate for a variable rate. A CDS allows a market participant to offset his or her credit risk with that of another. To swap the risk of default, the market participant buys a CDS from another who agrees to reimburse in the case a named borrower defaults.

Example asset classes or product classes for the contracts may include currency/rates, equity, credit and commodities. Each product may include one or more types of risk such as interest rates risk, credit risk, equity risk, commodity risk and FX risk. Each risk may include one or more risk measures such as delta, gamma, vega, and curvature. Delta may be the first order derivative with respect to underlying price. Gamma may be a second derivative from a value of the underlying instrument. Vega may be the first order derivative with respect to implied volatility. Curvature may describe additional risk on moves of delta in response to price fluctuations.

Figure 3:
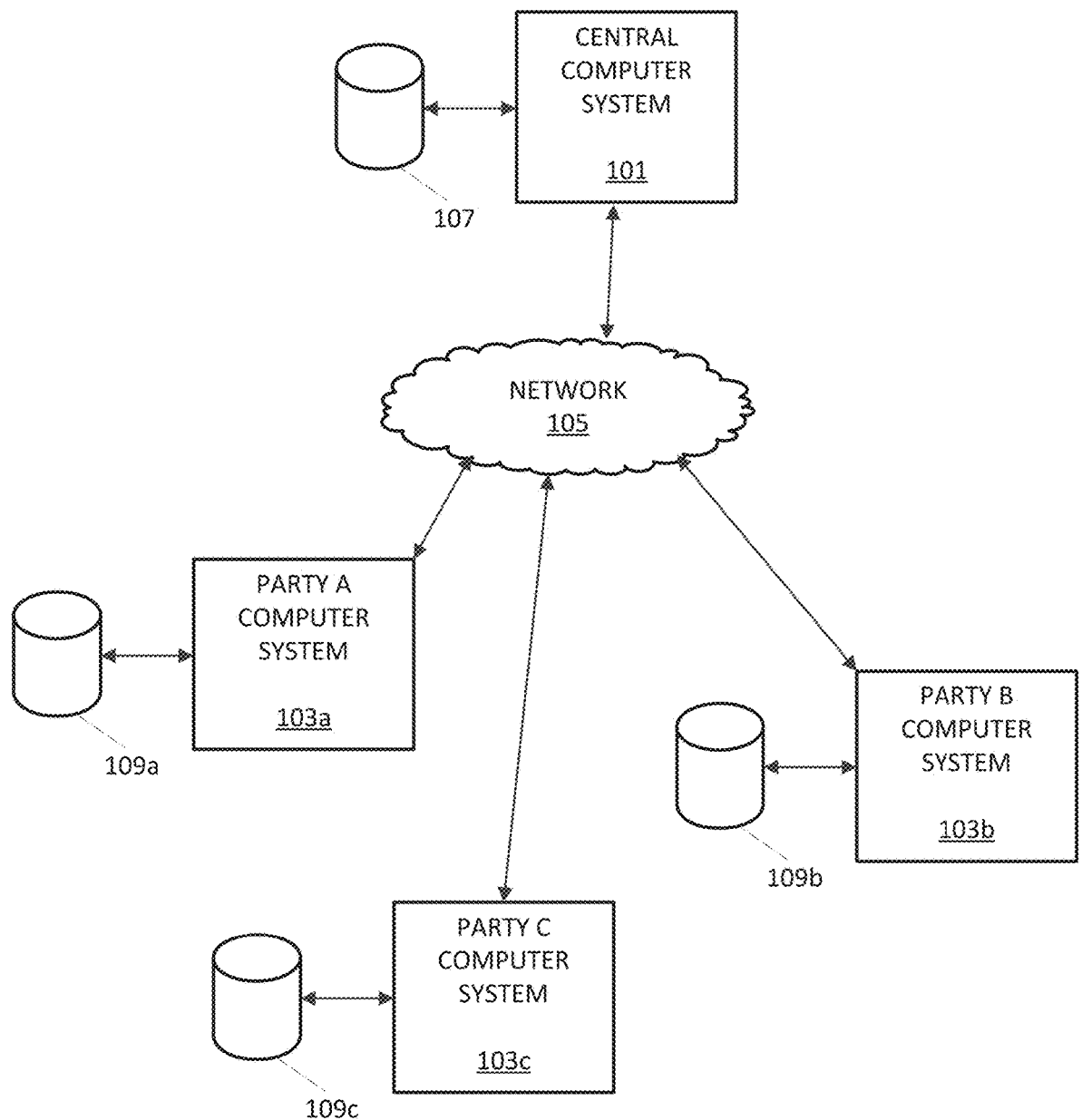
FIG. 3 depicts an illustrative computer network system for a direct system used to implement aspects of the disclosed embodiments.

FIG. 3 illustrates an illustrative computer network system for a direct system used to implement aspects of the disclosed embodiments. The computer network system includes any combination of a central computer system 101 with database 107, a party A computer system 103a with database 109a, a party B computer system 103b with database 109b, and a party C computer system 103c with database 109c. Database 109a, database 109b, database 109c, and database 107 may be referred to collectively as "database." In some examples, as discussed in more detail herein, the central computer system 101 constructs the polytope constraints, analyzes possible solutions, and calculates an optimal solution. In other examples, each computer system 103a-c constructs the polytope constraints, analyzes possible solutions, and calculates an optimal solution. In other embodiments portions of the calculations may be performed at each node. For example, the central computer system 101 may select solutions and provide polytope constraints and the computer systems 103a-c analyze the solutions and calculate the optimal solution. In another example, the computer systems 103a-c define the constraint polytope and send it to the central computer system 101, which analyzes the solutions and calculates the optimal solution. In any of these examples, the device that analyzes the constraint polytope for the possible solution and calculates the optimal solution may be referred to as the polytope controller ("PC"). Other examples may be possible.

The databases may include data indicative of the constraints as well as the points for possible solutions. The solutions may be made of many variables. The solutions may describe transactions or changes in positions of a portfolio associated with the respective computer system. The variables define a location in n-space. The same n-space describes a constraint polytope. The constraint polytope may be defined by a plurality of linear constraints including one or more linear inequalities stored in the database. The inequalities may be stored as a vector or a matrix with elements in the vector or matrix defining coefficients in each of the dimensions of the constraints. Thus, the database may store a constraint having n-elements for a constraint polytope in n-space.

The computer network system may be centralized such that the batch projections and analysis are performed on central computer system 101. Alternatively, the central computer system 101 may be omitted in a distributed system and performed at each party by the respective computer system 103a-c. Any number of computer systems and/or parties may be included in the system. Additional, different, or fewer components may be included.

The disclosed embodiments optimize the initial margin associated with such trades by optimizing the trades submitted by clients that meet the constraints. Optimizing trades between banks lower their initial margin with each other. There may be hundreds, thousands, or effectively, an infinite number of solutions that meet the constraints. Each potential solution defines a point, and each point represents thousands of trades which make up a proposed solution. The polytope is used to constrain the solution space.

Example trade constraints may include currency constraints or temporal constraints. The currency constraint may define a risk against a particular counterparty. In some examples, trades contribute to a certain bucket, and a bank may specify a constraint related to the bucket.

Example trade constraints for parties or market participants in OTC transactions may include currency/FX delta risk for a given currency pair against a counterparty, Currency/FX delta risk for a given currency pair overall counterparties. FX vega of a currency pair, interest rate delta risk against a given interest rate curve in a given currency, interest rate vega risk in a currency, CDS delta, CDS vega, commodity delta, commodity vega.

The following embodiments describe a process which is involving thousands of points in a multi-dimensional space, and at each iteration of evolution, points are projected to a set of linear inequalities with an accepted fail rate. Each iteration of evolution may move all points a limited but significant distance before the projection, creating the setup of batches. The following embodiments project data in batches and leverages the fact that there is some degree of similarity between points in a batch. Furthermore, it assumes that there is some degree of similarity between points in successive batches, although the characteristics of batches can evolve over time. The following embodiments analyze batches over time to adapt and improve efficiency of successive batches.

As described in more detail below, specialized hardware is utilized to process and analyze the point batches. The hardware may include a graphics processing unit (GPU) including an architecture specialized to achieve high scalability for analyzing the point batches described herein. The disclosed system projects multiple data points to a polytope in parallel using the architecture of the GPU. The GPU may utilize the same instructions for all points simultaneously in an iterative manner until the fail rate of points is acceptable. In other examples, another hardware device or CPU configured for parallel processing may be used such as a field programmable gate array. The hardware device may include at least a threshold number of cores (e.g., 60).

The disclosed system solves the problem of projecting large quantities of data points to a polytope in any given dimension, leveraging GPU architecture to achieve high scalability. The objective is not to find the mathematical optimal projection for each point, but to maximize throughput by accepting a reasonable imperfection in projection precision, in terms of optimality and feasibility, and an acceptable fail rate of points (i.e., a fraction of the data points will not be projected properly).

Figure 4:
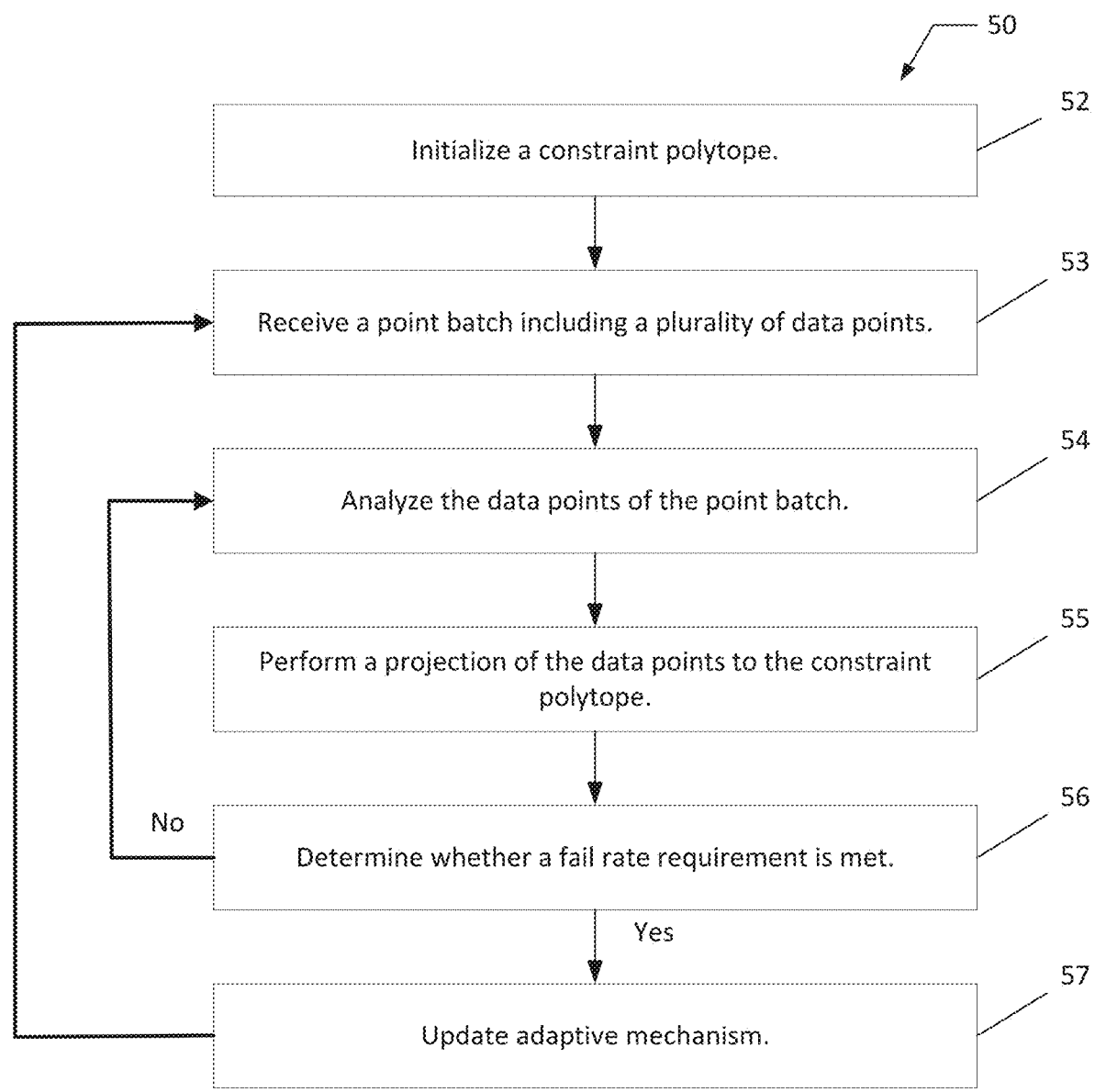
FIG. 4 depicts an example flowchart of the operation of the disclosed embodiments.

FIG. 4 depicts a flow chart showing operation of central computer system 101 and/or the party computer system 103 of the computer system network of FIG. 3 and additional systems described herein (e.g., FIG. 10), which may be referred to as an adaptive polytope projector. In particular FIG. 4 shows a computer implemented method 50 for performing a batch projection that dynamically adapts and selects one or more transactions to meet one or more constraints. The following embodiments may be initialized with any combination of space dimension, a polytope description, an accepted fail rate and a feasibility tolerance. A polytope can be described in many ways, but the embodiments expect linear inequalities or variable bounds. Any dimension reductions should be described as linear equalities. Additional, different, or fewer components may be included.

At act 52, the adaptive polytope projector initializes a constraint polytope. The initialization may include multiple stages such as a polytope parameter stage, an adaptive mechanism stage, and a user parameter stage. These stages may be performed at different times or the same time. The stages may be performed before any of the projection batches are performed or received. The stages may be performed in response to receipt of the first batch. The parameters defined in these stages may be reused for multiple batches. The parameters may be stored (e.g., in databases 107, 109) in association with the constraint polytope or an identifier for the constraint polytope.

The polytope parameter stage may define parameters of the constraint polytope. One example parameter is a constraint matrix A for the constraint polytope. An orthogonal matrix N spans the null space of A. A transformation matrix T sorts the variables or columns of A in a specific order needed by the algorithm, and adds entries for needed slack variables. An orthogonal projector P is $N^T N$ or N transposed multiplied with N. The partial matrix or submatrix $N^b$ denotes a portion of N defined by the last b rows of N. $P^b$ denotes $N^b N^{b^T}$.

The adaptive mechanism stage for initialization may define or initialize one or more vectors or matrices for the adaptive mechanism. A solution matrix $x^p$ is defined.

Variable bound vectors lb and ub are selected based on variable bounds. For example, if there are variable bounds (for example a trade cannot move more than a number (x) of millions) there is one entry of x millions. If there is a risk constraint, such as FX delta cannot move more than 100,000 against a counterparty, then there will be an entry of 100,000 for that as well.

Vector d is selected based on an approximation of another function. Vector a is a vector that is initialized in the adaptive mechanism stage and later updated. The vector a may be any number of dimensions. The number of dimensions is selected according to the number of inequalities of the polytope. The vector a is initialized to have a value of 1 or so that each component of the vector a has a value of 1. Other initialization techniques are possible.

The user parameter stage may define one or more user selections or user customizations. In one example, the user may select an iteration limit for the iterative loop described below between acts 56 and 54. The iteration limit may be an integer value (e.g., 3, 5, 10, 20 or another number of iterations). The user may select a setting or a numerical value for an accepted fail rate and/or a feasibility tolerance.

The fail rate may be defined as a fraction or percentage of the data points that are projected to inside the area of the constraint polytope. The fail rate could be, for example, 15% meaning that if 15 or less out of 100 data points are not projected to within the polytope the projection of the batch is still deemed successful.

The feasibility tolerance provides a limit on quantity of projected data points that can exceed an individual inequality. The feasibility tolerance may be defined by a vector having elements corresponding to each of the inequalities defining the constraint polytope. Alternatively, the feasibility tolerance may be a single number applied to all of the inequalities. The feasibility tolerance could be, for example, 10 meaning that an inequality can be breached with at the most 10 but still be deemed fulfilled.

In another example, the fail rate and/or feasibility tolerance may be variable. The fail rate may be changed according to an external factor. The external factor may be day of the week or day of the year. The external factor may be a prevailing interest rate. The external factor may be a market index. As the external factor changes the fail rate and/or feasibility tolerance is adjusted in response to changes in the external factor. In some examples, when the external factor increases, the fail rate and/or feasibility tolerance is increased. In other examples, when the external factor decreases, the fail rate and/or feasibility tolerance is decreased.

In another example, a distance tolerance provides a limit on a distance between the projected data points and an individual inequality. The distance tolerance may be defined by a vector having elements corresponding to each of the inequalities defining the constraint polytope.

Thus, the polytope controller is configured to initialize any number (or all) of the values for T, $x^p$, lb, ub, N, P, $N^b$, $P^b$, d and a used in the techniques described herein. The initialization may be before the projection of batches starts and the values may be reused. The value(s) for a may be first initialized at default value(s) and subsequently updated as the process repeats (performs multiple iterations) for a series of batches.

The linear constraints of an optimization model for the constraint polytope can be expressed in a constraint matrix C where some rows in the matrix are equality constraints and some are inequality constraints. The right-hand-side of C is equal to $b^c$, where again some rows of C are equalities to $b^c$ and some are inequalities to the same. Let s be a solution to the model and subjected to variable bounds $lb^s$ and $ub^s$ so that $lb_i^s \leq s_i \leq ub_i^s$. The linear parts of the model can thus be expressed as $$C^{eq}s = b^{ceq}$$

$$C^{in}s \leq b^{cin}$$

$$lb_i^s \leq s_i \leq ub_i^s \quad (1)$$

where $C^{eq}$ and $b^{ceq}$ correspond to the equality rows of C, and $C^{in}$ and $b^{cin}$ to the inequality rows. Rearrange s and the corresponding columns of C so that the indices with bounds other than infinity are at the end. Also, for each inequality constraint, add a slack variable at the end of the solution vector and convert the constraint to a zero-equality constraint, and add variable bounds for the slack variable reflecting the previous inequality limit. Let A be the new constraint matrix with rearranged columns and added slack columns, $x^a$ the new solution vector, $b^a$ the new right-hand-side and $lb^a$ and $ub^a$ the new variable bound vectors. The transformation matrix T can be used to compute s as $$s = Tx^a \quad (2)$$

At act 53, the polytope controller or adaptive polytope projector receives a point batch including a plurality of data points. The point batch includes possible solution to the optimization problem defined by the constraint polytope. There could be thousands of possible solutions. Each point is a solution. The solution has thousands of variables. One variable in one solution is a trade. The dimension of the solution space is up to thousands of dimensions. Each point is in a coordinate in the solution space. Each dimension in the solution space is a trade. In one example, each solution is a vector of variables where each variable is a trade. Each solution is subjected to constraints. The inequality constraints are defined by the polytope but there may also be equality constraints.

At act 54, the polytope controller or adaptive polytope projector analyzes the data points of the point batch. The analysis may involve many possible solutions (e.g., thousands of sets of trades). Building on equation (2) above, the model can now be expressed as $$Ax^a = b^a \quad (3)$$

$$lb_i^a \leq x_i^a \leq ub_i^a \quad (4)$$

The non-zero values of $b^a$ correspond to the original non-zero equality constraints. Solving to get a particular solution $x^p$ of equation (3), $x^a$ can now be written as $$x^a = x + x^p \quad (5)$$

If the variable bounds are updated with $-x^p$ to create the new variable bound vectors lb and ub, the model can now be written as $$Ax = 0 \quad (6)$$

$$lb_i \leq x_i \leq ub_i \quad (7)$$

A feasible solution to equation (6)-(7) is provided through equations (5) and (2) be a feasible solution to equation (1), i.e. it will reside within the polytope. A has m rows and n columns. The last b values of x are bounded, and this part of the solution is denoted $x^b$.

Let N be an orthogonal matrix spanning the null space of A, giving N the dimensions n rows and (n-m) columns. It should be noted that adding linear inequalities to the model will not increase the number of columns of N since doing so both adds a row and a column of A. Let z be any vector of $\mathbb{R}^{n-m}$, then any x created as $$x = Nz \quad (8)$$

will be a solution to (6) by definition. Let P denote the orthogonal projector $N^T N$, and then any x created as $$x = Px' \quad (9)$$

will be the closest projection to a solution of equation (6) of any vector x'. Let $N^b$ denote the last b rows of N, i.e. $N^b$ will be the rows of N which will determine the bounded variables given a vector on the form of z as $$x^b = N^b z \quad (10)$$

$N^{b^T}$ is a matrix which transforms v of to a vector on the form of z through $$z = N^{b^T} v \quad (11)$$

Let $P^b$ denote $N^b N^{b^T}$ and define $f: \mathbb{R}^b \to \mathbb{R}^b$ as $$f(v) = P^b v \quad (12)$$

$f(v)$ gives the impact $f(v)$ to add to $x^b$ given some input v through equation (11) and (10).

Define the function g: $\mathbb{R}^b \to \mathbb{R}^b$ as $$g(x) = \begin{cases} x_i^b - lb_i^b & \text{if } x_i^b < lb_i^b - \varepsilon, \\ 0 & \text{if } lb_i^b - \varepsilon \leq x_i^b \leq ub_i^b + \varepsilon, \\ x_i^b - ub_i^b & \text{if } ub_i^b + \varepsilon < x_i^b \end{cases} \quad (13)$$

where $\varepsilon$ is the feasibility tolerance and $x_i^b$ is a value of a bounded variable in a solution. $g(x)$ will give the bounded breach vector given an $x^b$. Let d be a vector of $\mathbb{R}^b$ constructed as $$d_i = \frac{1}{P_{ii}^b} \quad (14)$$

and a be a vector of $\mathbb{R}^b$ constructed as $$a = 1 \quad (15)$$

Figure 5:
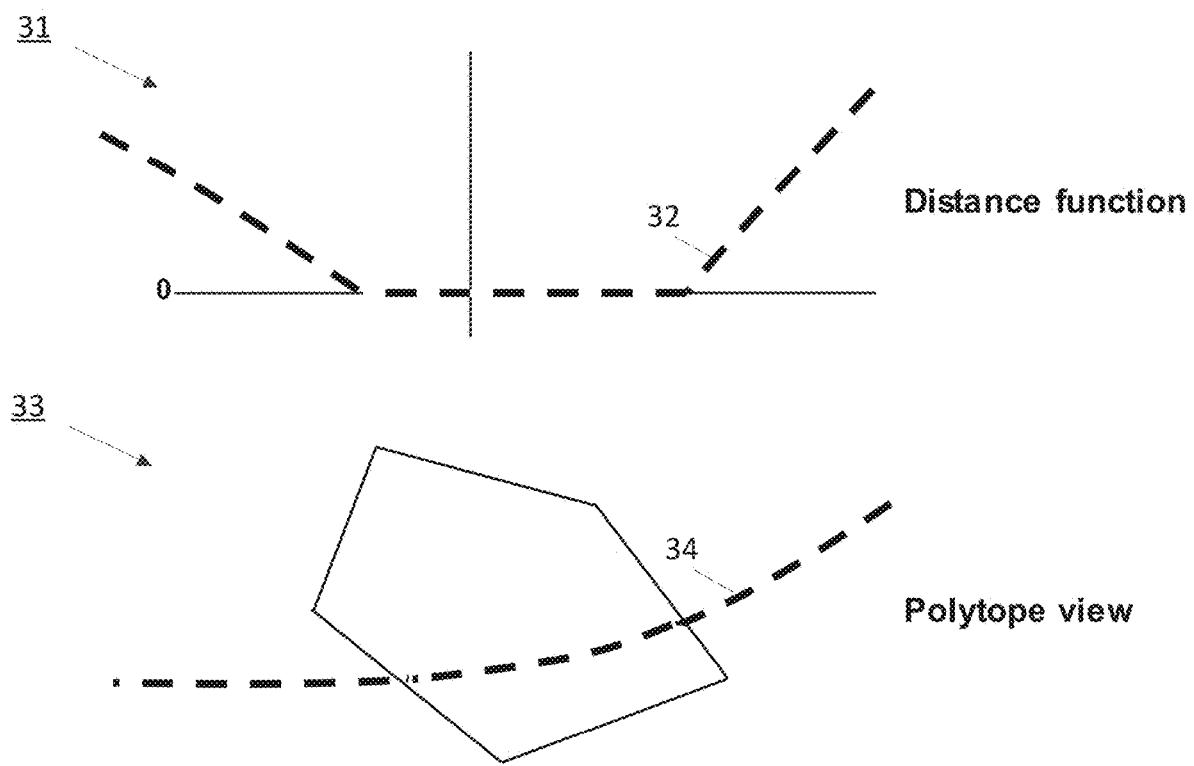
FIG. 5 depicts an example distance function for the projection.

At act 55, the polytope controller or adaptive polytope projector performs a projection of the data points to the constraint polytope. FIG. 5 illustrates a distance function 31 for a constraint polytope 33. For points along line 34, which starts spaced from the constraint polytope, intersects the constraint polytope, and ends spaced from the constraint polytope. Line 32 reflects this distance. Line 32 has a negative slope as line 34 approaches the constraint polytope, is at zero when line 34 intersects the constraint polytope, and has a positive slope as line 34 moves farther from the constraint polytope.

Assume that $p^s$ is an infeasible solution to equation (1), i.e. it is outside of the polytope, and $p^s$ is transformed to p using equations (2) and (5). If p is infeasible to equation (6) it is projected to the closest feasible solution to equation (6) using equation (9). In the case of evolutionary optimization, the point would be given as z and would then be transformed to p using equation (8), where p is a feasible solution to equation (6) by definition but infeasible to equations (6)-(7) since it is outside of the polytope. $p^b$ is the last b value of p which corresponds to the bounded variables of a solution, and thus $g(p^b)$ is the initial breach vector.

If the function h: $\mathbb{R}^b \rightarrow \mathbb{R}^b$ defined as $$h(v) = g(p^b + f(v)) \quad (16)$$

is 0 a feasible solution to (6)-(7) has been found. The feasible solution vector x is found through (11) and (8) as $$x = p + NN^{b^T} v \quad (17)$$

and the feasible solution s to (1) is then found through (5) and (2).

To find h(v)=0, v is updated as $$v^{j+1} = v^j - h(v^j) * d * a \quad (18)$$

$$v^0 = 0 \quad (19)$$

which has been proved efficient to make v converge and thus project the point.

In the iterations of (18) the significant computational effort is $f(v)$ which amounts to a matrix-vector multiplication of the dimensions (b,b)×(b,1). For a batch of size r, $f(v)$ is transformed to a matrix-matrix multiplication of the dimensions (b,b)×(b,r) where all points are projected simultaneously. Matrix-vector and matrix-matrix multiplications are very suitable to parallelize on the GPU. For each batch, the iterations of (18) are continued until the number of non-projected points are within the accepted fail rate or until the iteration limit is reached.

It is noteworthy that the main computational effort is dependent on the number of points in the batch and the number of bounded variables, inequalities of equations (6)-(7), but it is not dependent on the number of dimensions of the model.

The analyzation and projection steps (acts 54 and 55) process all data points in parallel. Other optimization methods involve solving a quadratic programming problem with standard algorithms, but such methods are not adaptive, apply to one point at a time, and do not allow imperfections. Typical evolutionary optimization uses penalty functions to steer the points towards the polytope over many iterations of the optimization by penalizing data points outside of the polytope, which not an alternative to the innovation since it keeps points infeasible and may not work or find feasible solutions.

Each element in the vector for g(x) is a distance to the inequality for that dimension of the constraint polytope. If there are 10 inequalities, equation (13) provides a vector with 10 elements for the distances between the potential solution and the constraint polytope. When one of the elements in the vector provided by equation (13) is zero, that element may be updated further. However, that variable may become infeasible again with Equation (16) since variables are connected typically and are impacted by each other. If one of the 10 variables changes, other variables may be updated. When a solution is reached within the polytope (all variables are within their bounds) the elements are not updated. In this example, when one of the elements in the vector provide by equation (13) is zero, the element may not be updated further.

At act 56, the polytope controller or adaptive polytope projector determines whether a fail rate requirement is met. For each batch, the iterations of (18) are continued until the number of non-projected points are within the accepted fail rate or until the iteration limit is reached.

At act 57, the polytope controller or adaptive polytope projector updates the adaptive mechanism. The adaptive mechanism updates the vector a for the next iteration and projection of the next point batch.

After a batch has been projected, a is updated as $$a_i = \begin{cases} \max(a_i - 0.01, 0.1) & \text{if the } i\text{th variable was projected in 1 iteration for all solutions} \\ & \text{or if more than 30\% of the projections of the } i\text{th variable gave sign flip of } h_i(v), \\ \min(a_i + 0.01, 1.5) & \text{else} \end{cases} \quad (20)$$

This makes the projection adapt to the model over time to achieve projections in less iterations. So each time vector a is slightly different, using information from the previous batch. Vector a continues to evolve through the process. If you receive multiple batches spawned from the same distribution, vector a will eventually stabilize. Even if the batch distribution changes, vector a continues to evolve along with the change in the distribution of the batch.

Through the adaptive modification of vector a, the optimal solution, or the solution having the most constraints or inequality satisfied is calculated. Through the multiple iterations of the adaptive modification of vector a, an optimal template (e.g., set of values for vector a) for the first point batch is calculated by the polytope controller or adaptive polytope projector.

The number of space dimensions and the number of equalities have no impact on the time complexity after the initialization, but the process time is linearly proportionate to the number of polytope sides as shown above. Accordingly, the disclosed system is suitable for repeated projection of points and batches to the same polytope where the work of initialization is performed only once. In contrast, quadratic programming has at best polynomial time complexity for every new point to be projected. If the same polytope is to be used in several processes over time, the initialization can be performed once and then serialized to a hard drive to eliminate the initialization phase in later projections. The disclosed system can be separated into initialization and projection phases, making it suitable for recurrent projection to a polytope (new functionality, improves speed/reduces computations/reduces hardware).

The disclosed embodiments provide an improvement to the efficiency and computer resource requirements compared to existing technologies. Example existing technologies may include systems for solving linear equations. Examples may include singular value decomposition, lower-upper (LU) decomposition, Cholesky decomposition, or other techniques. All these techniques have in common that the time complexity is in the area of $O(n^3)$ where n is the number of variables.

It can be shown for the disclosed embodiments that the time complexity for the initialization phase is proportionate to $O(mn^2)$ or proportionate and less than $O(n^3)$ depending on approach, but in practice the time of this phase can be reduced significantly if sparse representations of inequalities and equalities are used. Thus, a time complexity for the initialization phase of the disclosed embodiments is equal or less than a time complexity for a quadratic optimization solution for the constraint polytope.

The inner workings of the analyzation and projection attempt phases can loosely be described as a numerical approach to finding a minimum to the distance function of each data point individually, by processing all data points in parallel.

The significant computational work in the last stage is matrix-vector multiplications for a point, where the sizes of the vector and matrix are proportionate to the number of inequalities, and matrix-matrix multiplications for a batch, where the matrix is the same as for a point and the vector grows to a matrix with the size proportionate to the number of points in the batch. The computational complexity of matrix-vector multiplication is $O(n^2)$ and of matrix-matrix multiplication is $O(n^3)$. Again, this should be compared to the time complexity in the area of $O(n^3)$ for quadratic optimization of one point, where this stage achieves $O(n^3)$ for the full batch. Since computations are offloaded to a GPU the practical time complexity for matrix-matrix is very close to $O(n)$. Thus, for the projection attempts, of any number of variables using parallel processing, the time complexity approximates $O(n)$.

Figure 6:
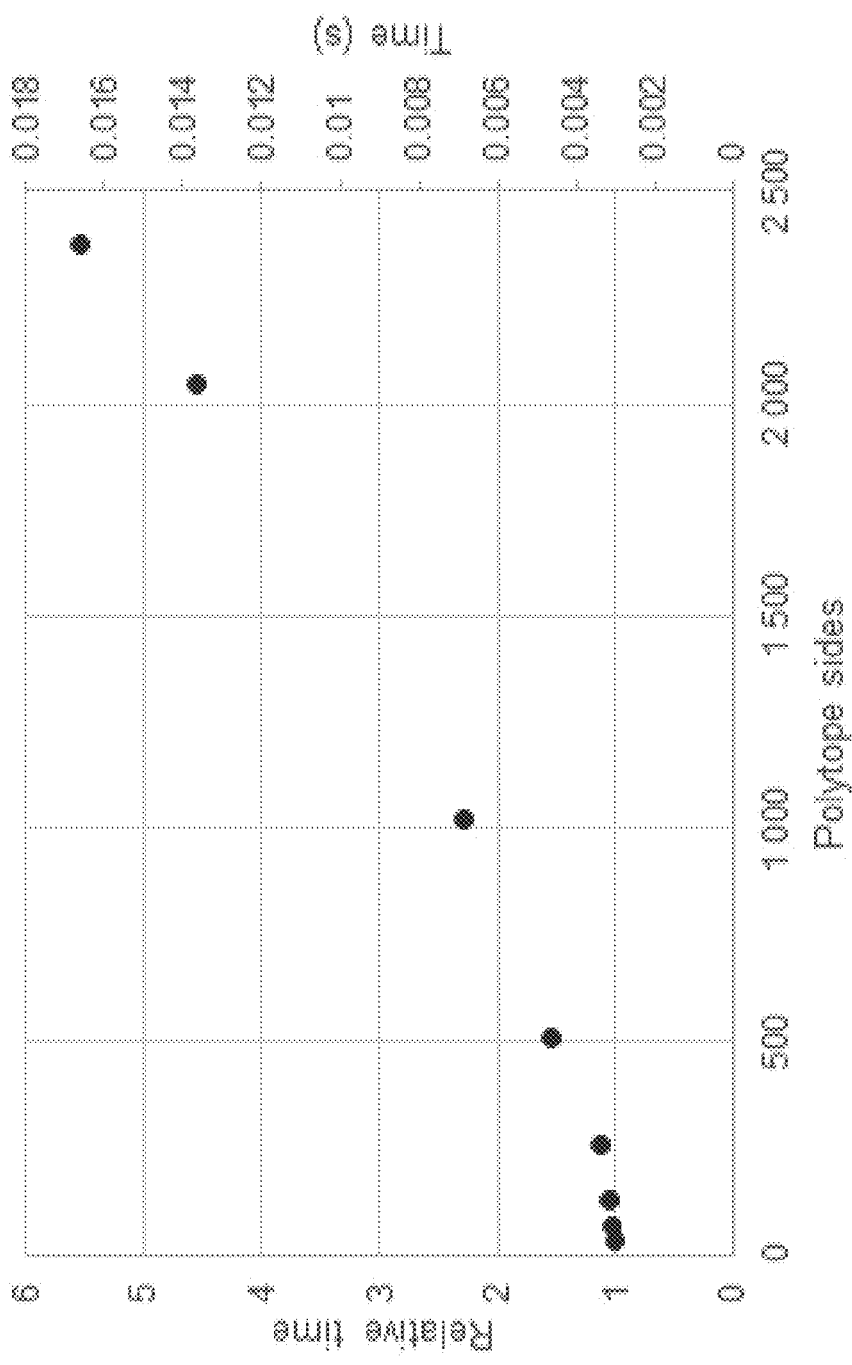
FIG. 6 depicts a chart for the time complexity with increased complexity for the disclosed embodiments.

For example, FIG. 6 illustrates that time grows close to linearly with polytope size, where 1,024 points are projected multiple times to polytopes with increased number of sides, without adaptation. In this graph the number of polytope sides or inequalities is varied, but in general performance graphs are created from a setup with a batch size of 1,024, a 4,421-dimensional space, 570 equalities and a polytope with 2,378 sides. The fail rate is 15% and a reasonable low feasibility tolerance is chosen. Similar behavior can in general be expected from most setups.

One important aspect to notice is that the number of space dimensions and the number of equalities have no impact on the time complexity after the initialization, but the process time of a batch projection is approximately linearly proportionate to the number of polytope sides due to possible parallelism as shown above. This makes the embodiments suitable for repeated projection of points and batches to the same polytope where the work of initialization is performed once, again in $O(mn^2)$ or $O(n^3)$. This can be compared to quadratic programming which has at the best polynomial time complexity for every new point to be projected. One other important aspect is that if the same polytope is to be used in several processes over time, the initialization can be performed once and then serialized to a hard drive or memory to eliminate the initialization phase in later projections.

Figure 7:
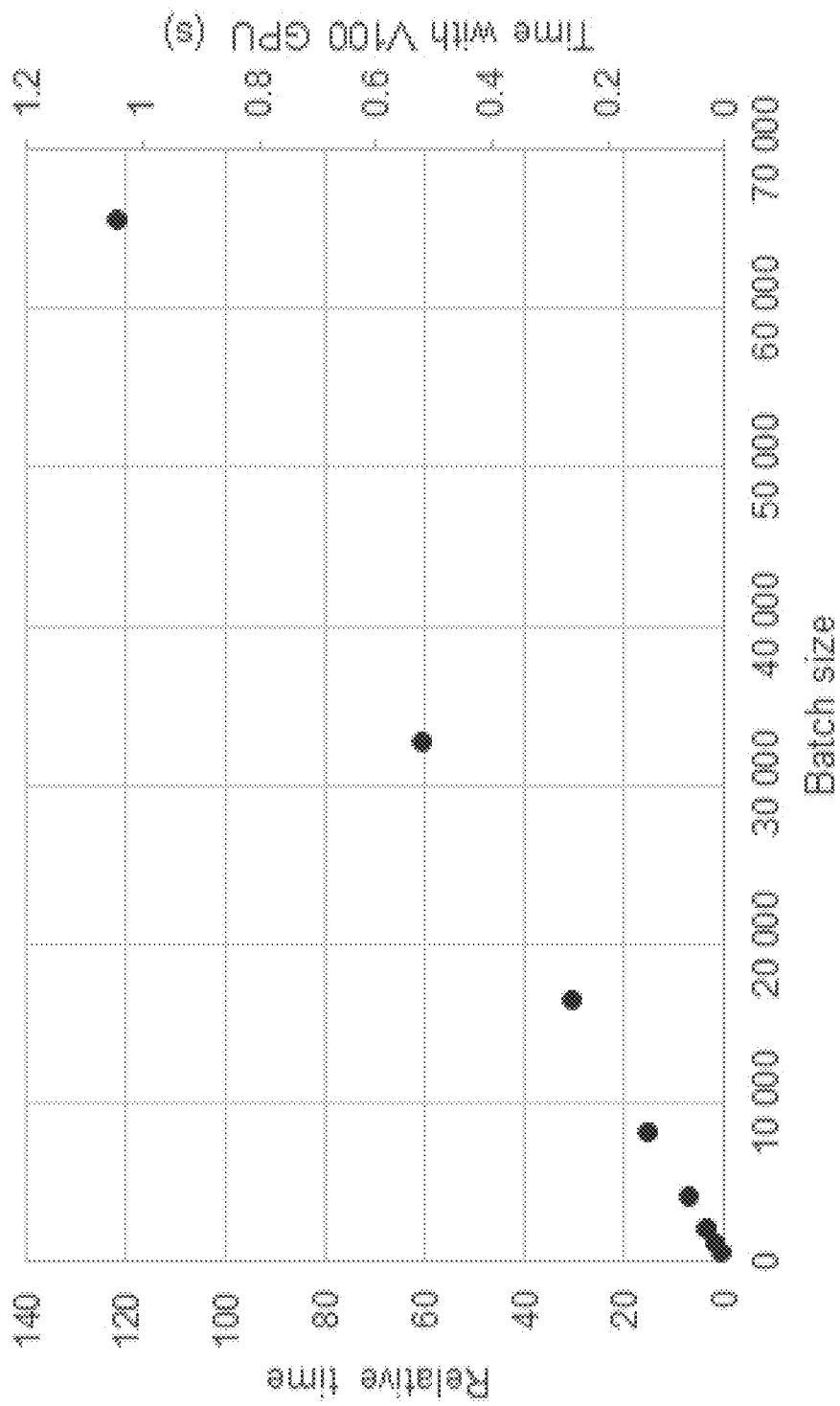
FIG. 7 depicts a chart for the time complexity with increased size for the disclosed embodiments.

FIG. 7 illustrates that the process time grows linearly with the batch size. Batches of increased size are projected to the same polytope without adaptation. At the largest size 65,500 points are projected in just above one second. When a batch has been successfully projected to the polytope the described embodiments analyze the behavior of the process and make small, speculative adaptations to internal parameters.

Figure 8:
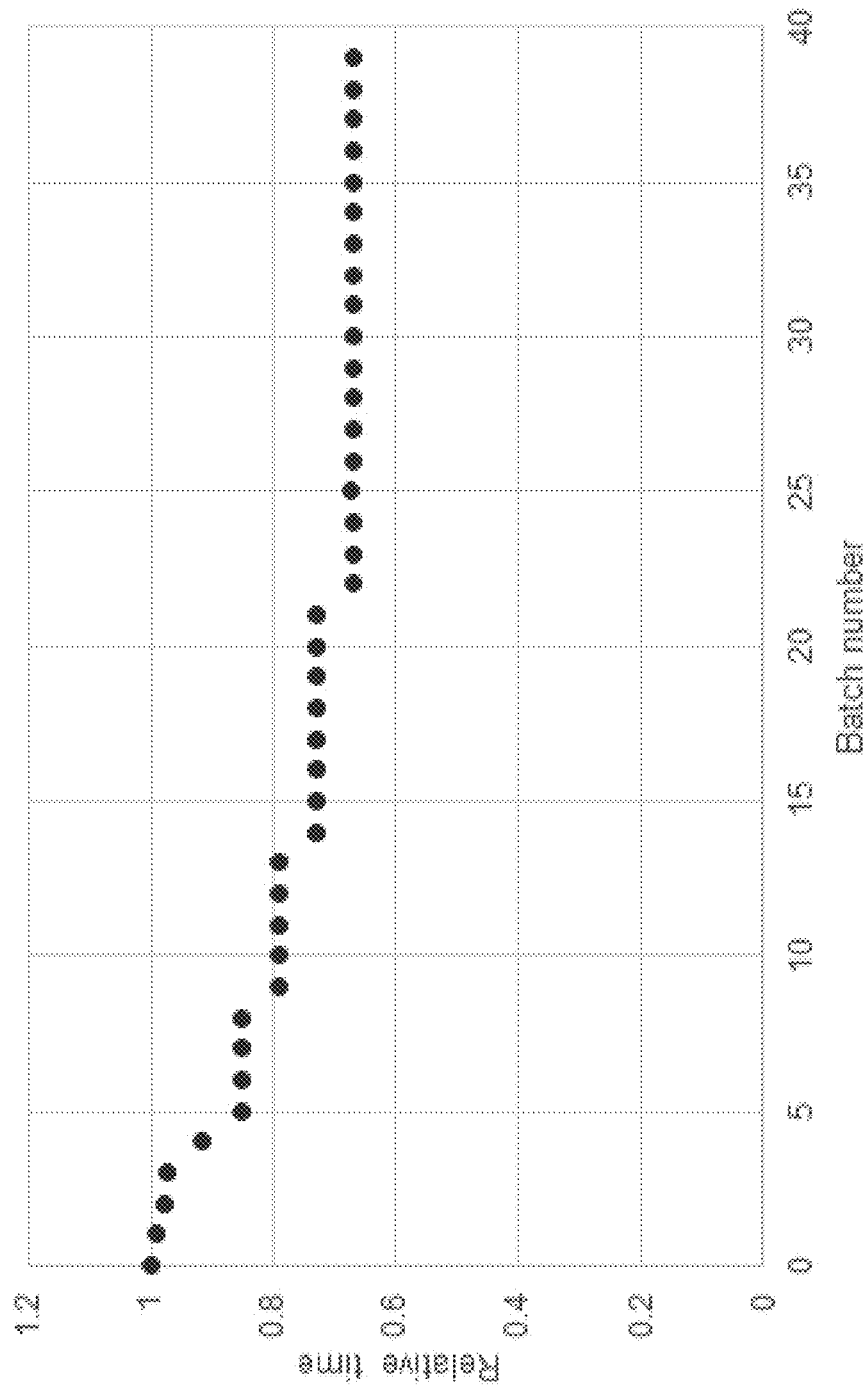
FIG. 8 depicts a chart for repeating the disclosed embodiments on the same batch of data.
Figure 9:
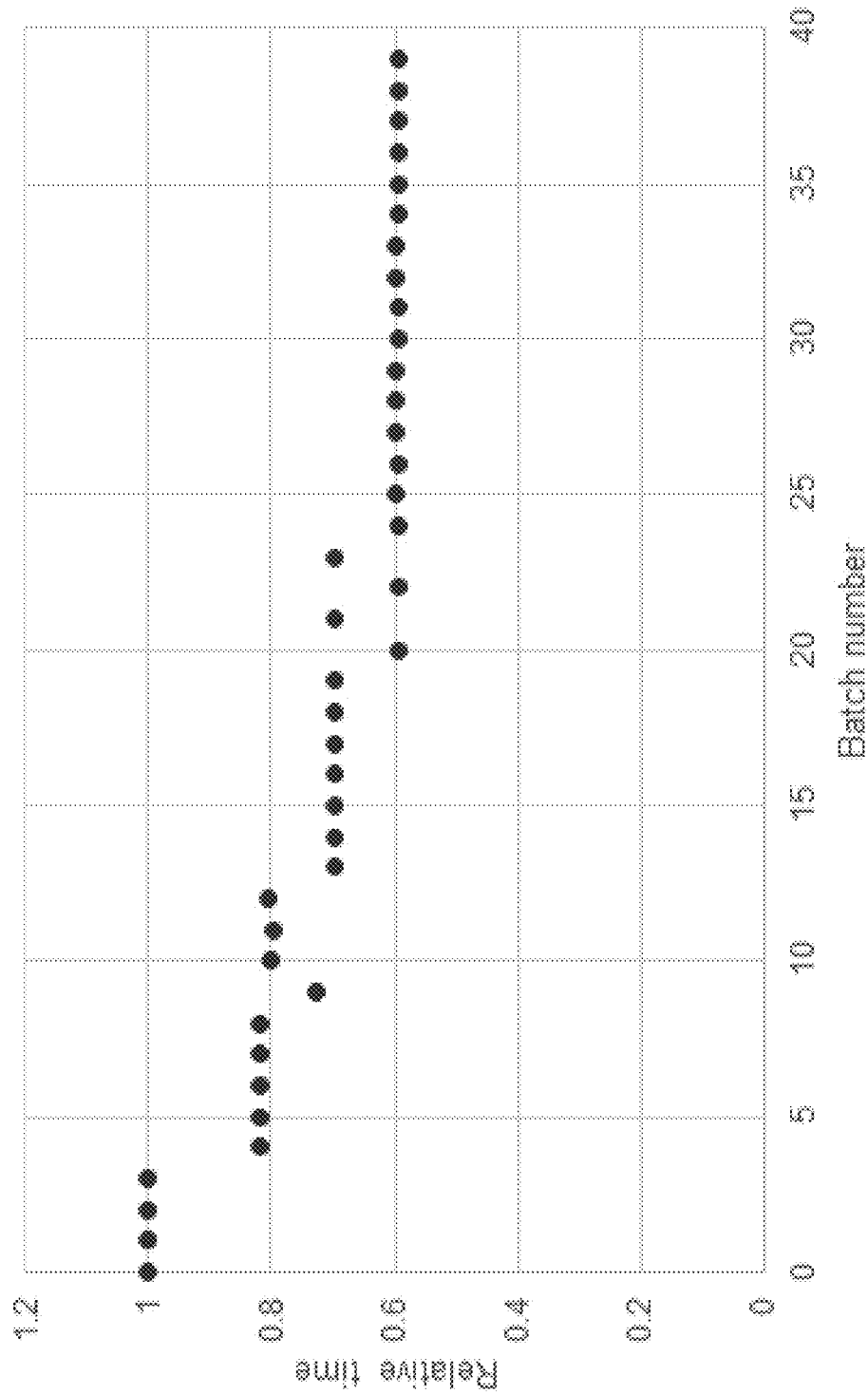
FIG. 9 depicts a chart for repeating the disclosed embodiments on the same data distribution.

FIG. 8 illustrates that, with the same batch repeatedly projected, after consecutive batch projections the adaptations will stabilize and an optimal setup for the characteristics of the data batches has been achieved. FIG. 9 illustrates that different batches but from the same distribution is repeatedly projected to a polytope with adaptation and an improvement of process time of about 40% is achieved.

If the characteristics or distribution of batches evolve over time the embodiments will continue to speculatively adapt. With small changes to the distribution the process time improvement is expected to continue to be high and the embodiments will adapt smoothly, but with larger changes it would be expected that the process time improvement decreases before the adaptation has stabilized to the new characteristics of batches.

The disclosed system projects/moves the data points to within the polytope in every optimization iteration. For example, a process is evolving thousands of points in a multi-dimensional space, and at each iteration of evolution, points are projected to a set of linear inequalities with an accepted fail rate. Each point may represent around 4,000 dimensions (the number of different trades in that point). Each iteration of evolution will move all points a limited but significant distance before the projection.

The embodiments are split between initialization and projection, making it suitable for recurrent projection to a polytope (new functionality, improves speed/reduces computations/reduces hardware). The embodiments adapt to batch distributions and achieve significant process time improvement over time (improves speed/reduces computations/reduces hardware). Time complexity is constantly proportionate to the number of space dimensions after initialization (improves speed/reduces computations/reduces hardware). Time complexity is constantly proportionate to the number of equalities after initialization (improves speed/reduces computations/reduces hardware). Time complexity is approximately linearly proportionate to the number of polytope sides/inequalities after initialization due to possible parallelism (improves speed/reduces computations/reduces hardware).

Figure 10:
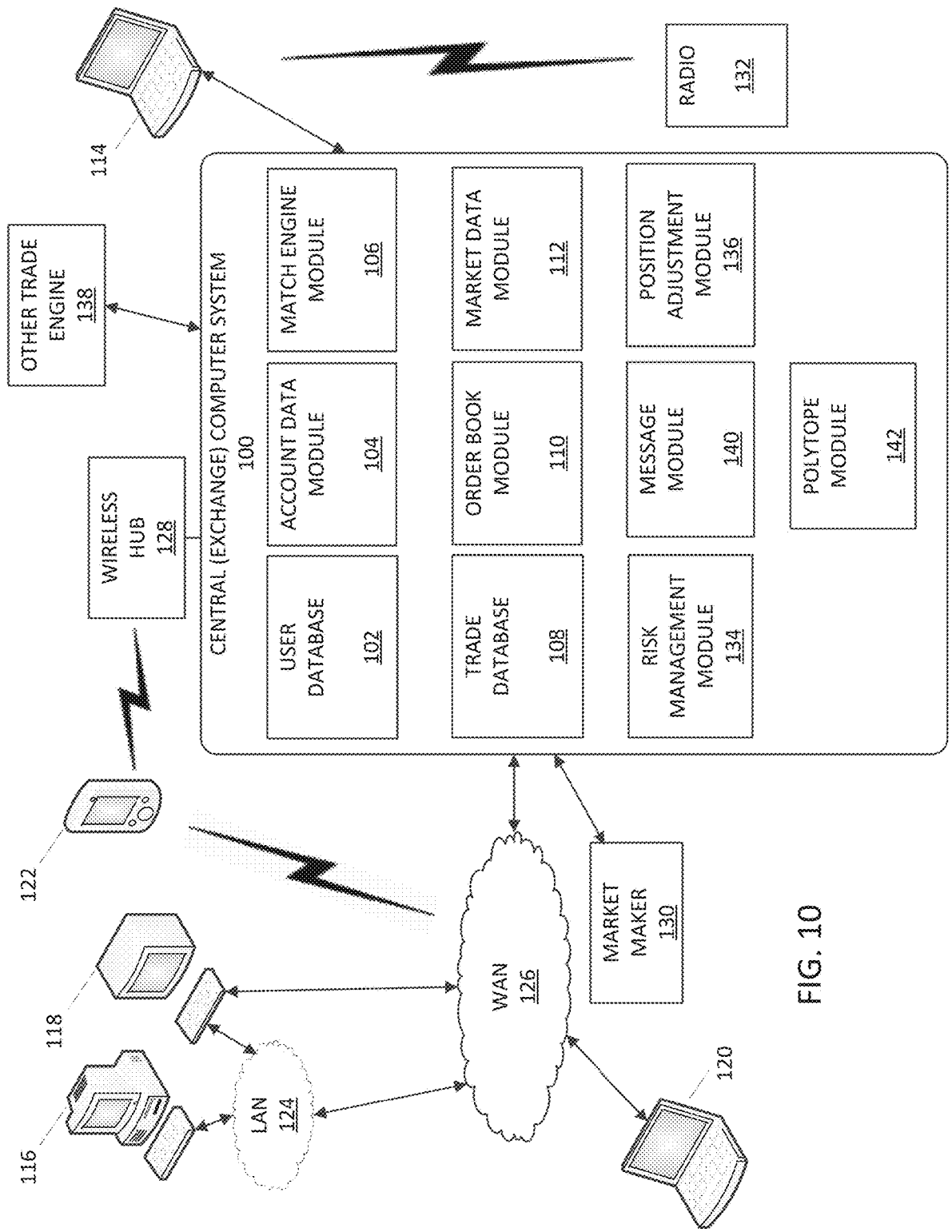
FIG. 10 depicts an illustrative computer network system for an exchange that may be used to implement aspects of the disclosed embodiments.

As an alternative to the computer system of FIG. 3, an exemplary trading network environment for implementing trading systems and methods is shown in FIG. 10. An Exchange Computer System 100 receives messages that include orders and transmits market data related to orders and trades to users, such as via wide area network 126 and/or local area network 124 and computer devices 114, 116, 118, 120 and 122, as will be described below, coupled with the Exchange Computer System 100.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, <N>, or combinations thereof" are defined by the Applicant in the broadest sense, superseding any other implied definitions here before or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

The disclosed embodiments may be discussed in relation to futures and/or options on futures trading, and it may be appreciated that they may be applicable to any equity, options or futures trading system, e.g., Exchange, Electronic Communication Network ("ECN"), Alternative Trading System ("ATS"), or Swap Execution Facility ("SEF"), or market now available or later developed, e.g. cash, Futures, etc., as well as any instrument traded thereon. It may be appreciated that a trading environment, such as a futures exchange as described herein, implements one or more economic markets where rights and obligations may be traded. As such, a trading environment may be characterized by a need to maintain market integrity, transparency, predictability, fair/equitable access and participant expectations with respect thereto. For example, an exchange must respond to inputs, such as trade orders, cancellation, etc., in a manner as expected by the market participants, such as based on market data, e.g. prices, available counter-orders, etc., to provide an expected level of certainty that transactions may occur in a consistent and predictable manner and without unknown or unascertainable risks. In addition, it may be appreciated that electronic trading systems further impose additional expectations and demands by market participants as to transaction processing speed, latency, capacity and response time, while creating additional complexities relating thereto. Accordingly, as will be described, the disclosed embodiments may further include functionality to ensure that the expectations of market participants are met, e.g. that transactional integrity and efficiency are maintained.

Electronic trading systems ideally attempt to offer an objective, efficient, fair and balanced market where market prices reflect a true consensus of the value of products traded among the market participants, where the intentional or unintentional influence of human interaction may be minimized if not eliminated, and where unfair or inequitable advantages with respect to information access are minimized if not eliminated. The current systems ideally attempt to increase liquidity, decrease message volume, and increase matching performance.

An exchange provides one or more markets for the purchase and sale of various types of products including financial instruments such as stocks, bonds, futures contracts, options, currency, cash, and other similar instruments. Agricultural products and commodities are also examples of products traded on such exchanges. A futures contract is a product that is a contract for the future delivery of another financial instrument such as a quantity of grains, metals, oils, bonds, currency, or cash. Generally, each exchange establishes a specification for each market provided thereby that defines at least the product traded in the market, minimum quantities that must be traded, and minimum changes in price (e.g., tick size). For some types of products (e.g., futures or options), the specification further defines a quantity of the underlying product represented by one unit (or lot) of the product, and delivery and expiration dates. As will be described, the Exchange may further define the matching algorithm, or rules, by which incoming orders will be matched/allocated to resting orders.

In particular, electronic trading of financial instruments, such as futures contracts, may be conducted by market participants sending orders, such as to buy or sell one or more futures contracts, in electronic form to the Exchange. These electronically submitted orders to buy and sell are then matched, if possible, by the Exchange, i.e. by the Exchange's matching engine, to execute a trade. Outstanding (unmatched, wholly unsatisfied/unfilled or partially satisfied/filled/completed) orders are maintained in one or more data structures or databases referred to as "order books," such orders being referred to as "resting," and made visible, i.e., their availability for trading is advertised, to the market participants through electronic notifications/broadcasts, referred to as market data feeds. An order book/data structure may be typically maintained for each product, e.g. instrument, traded on the electronic trading system and generally defines or otherwise represents the state of the market for that product, i.e. the current prices at which the market participants are willing to buy or sell that product. As such, as used herein, an order book for a product may also be referred to as a market for that product. A CLOB (Central Limit Order Book) may be a type of transparent order book system that matches customer orders.

In the exemplary embodiments, all transactions for a particular market may be ultimately received at the electronic trading system via one or more points of entry, e.g. one or more communications interfaces, at which the disclosed embodiments apply determinism, which as described may be at the point where matching occurs, e.g. at each match engine (where there may be multiple match engines, each for a given product/market, or moved away from the point where matching occurs and closer to the point where the electronic trading system first becomes "aware" of the incoming transaction, such as the point where transaction messages, e.g. orders, ingress the electronic trading system. Generally, the terms "determinism" or "transactional determinism" may refer to the processing, or the appearance thereof, of orders in accordance with defined business rules. Accordingly, as used herein, the point of determinism may be the point at which the electronic trading system ascribes an ordering to incoming transactions/orders relative to other incoming transactions/orders such that the ordering may be factored into the subsequent processing, e.g. matching, of those transactions/orders as will be described. See U.S. patent application Ser. No. 14/074,675, filed on Nov. 7, 2013, published as U.S. Patent Application Publication No. 2015/0127516, entitled "TRANSACTIONALLY DETERMINISTIC HIGH SPEED FINANCIAL EXCHANGE HAVING IMPROVED, EFFICIENCY, COMMUNICATION, CUSTOMIZATION, PERFORMANCE, ACCESS, TRADING OPPORTUNITIES, CREDIT CONTROLS, AND FAULT TOLERANCE", incorporated by reference herein.

Upon receipt of an incoming order to trade in a particular financial instrument, whether for a single component financial instrument, e.g. a single futures contract, or for multiple component financial instruments, e.g. a combination contract such as a spread contract, a match engine, e.g. a hardware matching processor match engine module 106, as will be described in detail below, will attempt to identify a previously received but unsatisfied order counter thereto, i.e. for the opposite transaction (buy or sell) in the same financial instrument at the same or better price (or, as will be described, other fixed parameter such as delta) (but not necessarily for the same quantity unless, for example, either order specifies a condition that it must be entirely filled or not at all). Previously received but unsatisfied orders, i.e. orders which either did not match with a counter order when they were received or their quantity was only partially satisfied, referred to as a partial fill, are maintained by the electronic trading system in an order book database/data structure to await the subsequent arrival of matching orders or the occurrence of other conditions which may cause the order to be removed from the order book.

If the match engine identifies one or more suitable previously received but unsatisfied counter orders, they, and the incoming order, are matched to execute a trade there between to at least partially satisfy the quantities of one or both of the incoming order or the identified orders. If there remains any residual unsatisfied quantity of the identified one or more orders, those orders are left on the order book with their remaining quantity to await a subsequent suitable counter order, i.e. to rest. If the match engine does not identify a suitable previously received but unsatisfied counter order, or the one or more identified suitable previously received but unsatisfied counter orders are for a lesser quantity than the incoming order, the incoming order is placed on the order book, referred to as "resting", with original or remaining unsatisfied quantity, to await a subsequently received suitable order counter thereto. The match engine then generates match event data reflecting the result of this matching process, which may further be used to generate market data transmitted to the market participants. Other components of the electronic trading system, as will be described, then generate the respective order acknowledgment and market data messages and transmit those messages to the market participants.

As was described above, the financial instruments which are the subject of the orders to trade, may include one or more component financial instruments. While each financial instrument may have its own order book, i.e. market, in which it may be traded, in certain embodiments, each financial instrument, may be listed in alternative related order books. Accordingly, when an order for a financial instrument is received, it may be matched against a suitable counter order in its own order book or, possibly, against other suitable counter orders in the related order books. For example, an order for a volatility options quoted contract may be matched against another suitable order for that contract. However, it may also be matched against suitable separate counter orders for the premium quoted options or futures found in their respective CLOBs (both the premium quoted and the volatility quoted being related to another using a pricing model). This is referred to as "implication" where a given order for a financial instrument may be matched via a combination of suitable counter orders for instruments which share common, or otherwise interdependent, financial variables.

The order for a particular instrument actually received from a market participant, whether it comprises one or more component financial instruments, is referred to as a "real" or "outright" order, or simply as an outright. The one or more orders which must be synthesized into order books other than the order book for the outright order in order to create matches therein, are referred to as "implied" orders. Upon receipt of an incoming order, the identification or derivation of suitable implied orders which would allow at least a partial trade of the incoming outright order to be executed is referred to as "implied matching", the identified orders being referred to as an "implied match." There may be numerous different implied matches identified which would allow the incoming order to be at least partially matched and mechanisms may be provided to arbitrate among them, such as by picking the implied match comprising the least number of synthesized orders.

Upon receipt of an incoming order, or thereafter, the identification or derivation of a combination of one or more suitable counter orders which have not actually been received but if they were received, would allow at least a partial trade of the incoming order to be executed, is referred to as an "implied opportunity." As with implied matches, there may be numerous implied opportunities identified for a given incoming order Implied opportunities are advertised to the market participants, such as via suitable synthetic orders, e.g. counter to the desired order, being placed on the respective order books to rest (or give the appearance that there is an order resting) and presented via the market data feed to appear available to trade in order to solicit the desired orders from the market participants. There may be numerous implied opportunities, the submission thereof, would allow the incoming order to be at least partially matched.

In general, advertising implied opportunities will encourage traders to enter the opposing orders to trade with them. The more implied opportunities that the match engine of an electronic trading system can calculate/derive, the greater this encouragement will be and the more the Exchange will benefit from increased transaction volume. However, identifying implied opportunities may be computationally intensive. In a high performance trading system where low transaction latency is important, it may be important to identify and advertise implied opportunities quickly so as to improve or maintain market participant interest and/or market liquidity.

A futures calendar spread may be composed of a long or short position in the futures in one expiration cycle and a position with the opposite sign in a different expiration. Example: short one contract of February natural gas and buy one contract of April natural gas. The profit or loss to a futures calendar position depends on changes in the prices of the contracts, and because the two contracts are on the same underlying asset the profitability of the spread will depend more specifically on changes in the term structure of the futures curve. In this example, if the prices of both contracts decline, but the February contract declines more, the position will make a profit.

An options calendar spread may be composed of two contracts with the same underlying asset, the same right (call or put), the same strike price, and different expiration months. This sort of calendar spread is typically opened at the same time by buying one option and selling the other, e.g. by selling at the money call in the first expiration cycle and buying at the money call in the second expiration cycle. While a futures calendar is affected by changes in the prices of the futures contracts, an options calendar is affected not just by price changes but also by changes in implied volatility. In fact, a short calendar (sell the longer dated option and buy the nearer one) is one of the simpler ways to gain long volatility exposure using options.

Receiving a bid for the implied book may create multiple orders in the explicit books. In certain embodiments, the exchange system (and the match engine(s)) are configured to imply across more than three order books. As illustrated in the calendar spread scenarios, the exchange system may create implied books or imply across spreads.

Matching, which is a function typically performed by the Exchange, is a process, for a given order which specifies a desire to buy or sell a quantity of a particular instrument at a particular price, of seeking/identifying one or more wholly or partially, with respect to quantity, satisfying counter orders thereto, e.g. a sell counter to an order to buy, or vice versa, for the same instrument at the same, or sometimes better, price (but not necessarily the same quantity), which are then paired for execution to complete a trade between the respective market participants (via the Exchange) and at least partially satisfy the desired quantity of one or both of the order and/or the counter order, with any residual unsatisfied quantity left to await another suitable counter order, referred to as "resting."

The Exchange Computer System, as will be described below, monitors incoming orders received thereby and attempts to identify, i.e., match or allocate, as will be described in more detail below, one or more previously received, but not yet matched, orders, i.e. limit orders to buy or sell a given quantity at a given price, referred to as "resting" orders, stored in an order book database, wherein each identified order is contra to the incoming order and has a favorable price relative to the incoming order. An incoming order may be an "aggressor" order, i.e., a market order to sell a given quantity at whatever may be the current resting bid order price(s) or a market order to buy a given quantity at whatever may be the current resting ask order price(s). An incoming order may be a "market making" order, i.e. a market order to buy or sell at a price for which there are currently no resting orders. In particular, if the incoming order is a bid, i.e. an offer to buy, then the identified order(s) will be an ask, i.e. an offer to sell, at a price that is identical to or higher than the bid price. Similarly, if the incoming order is an ask, i.e. an offer to sell, the identified order(s) will be a bid, i.e. an offer to buy, at a price that is identical to or lower than the offer price.

Upon identification (matching) of a contra order(s), a minimum of the quantities associated with the identified order and the incoming order is matched and that quantity of each of the identified and incoming orders become two halves of a matched trade that is sent to a clearinghouse. The Exchange Computer System considers each identified order in this manner until either all of the identified orders have been considered or all of the quantity associated with the incoming order has been matched, i.e. the order has been filled. If any quantity of the incoming order remains, an entry may be created in the order book database and information regarding the incoming order is recorded therein, i.e. a resting order is placed on the order book for the remaining quantity to await a subsequent incoming order counter thereto.

Traders access the markets on a trading platform using trading software that receives and displays at least a portion of the order book for a market, i.e. at least a portion of the currently resting orders, enables a trader to provide parameters for an order for the product traded in the market, and transmits the order to the Exchange Computer System. The trading software typically includes a graphical user interface to display at least a price and quantity of some of the entries in the order book associated with the market. The number of entries of the order book displayed is generally preconfigured by the trading software, limited by the Exchange Computer System, or customized by the user. Some graphical user interfaces display order books of multiple markets of one or more trading platforms. The trader may be an individual who trades on his/her behalf, a broker trading on behalf of another person or entity, a group, or an entity. Furthermore, the trader may be a system that automatically generates and submits orders.

If the Exchange Computer System identifies that an incoming market order may be filled by a combination of multiple resting orders, e.g. the resting order at the best price only partially fills the incoming order, the Exchange Computer System may allocate the remaining quantity of the incoming order, i.e. that which was not filled by the resting order at the best price, among such identified orders in accordance with prioritization and allocation rules/algorithms, referred to as "allocation algorithms" or "matching algorithms," as, for example, may be defined in the specification of the particular financial product or defined by the Exchange for multiple financial products. Similarly, if the Exchange Computer System identifies multiple orders contra to the incoming limit order and that have an identical price which may be favorable to the price of the incoming order, i.e. the price is equal to or better, e.g. lower if the incoming order is a buy or higher if the incoming order is a sell, than the price of the incoming order, the Exchange Computer System may allocate the quantity of the incoming order among such identified orders in accordance with the matching algorithms as, for example, may be defined in the specification of the particular financial product or defined by the Exchange for multiple financial products.

In certain embodiments, the allocation or matching algorithms may take into consideration if the order is "real" (explicit or implicit). As discussed below, these algorithms may include multiple strategies that may be presented transparently to the customers so that they may be aware of how the match engine operates. Since implied orders are synthetically created (and not received), they may not correspond to the FIFO strategy. In such a scenario, the implied orders may be treated as junior to the real orders. Alternatively, the match engine may treat the implied order as an extension of the original real order and give the implied order the same time priority. These scenarios and others are described below.

As was noted above, an Exchange must respond to inputs, such as trader orders, cancellation, etc., in a manner as expected by the market participants, such as based on market data, e.g. prices, available counter-orders, etc., to provide an expected level of certainty that transactions will occur in a consistent and predictable manner and without unknown or unascertainable risks. Accordingly, the method by which incoming orders are matched with resting orders must be defined so that market participants have an expectation of what the result will be when they place an order or have resting orders and incoming order is received, even if the expected result is, in fact, at least partially unpredictable due to some component of the process being random or arbitrary or due to market participants having imperfect or less than all information, e.g. unknown position of an order in an order book. Typically, the Exchange defines the matching/allocation algorithm that will be used for a particular financial product, with or without input from the market participants. Once defined for a particular product, the matching/allocation algorithm is typically not altered, except in limited circumstance, such as to correct errors or improve operation, so as not to disrupt trader expectations. It will be appreciated that different products offered by a particular Exchange may use different matching algorithms.

One exemplary system for matching is described in U.S. patent application Ser. No. 13/534,499, filed on Jun. 27, 2012, entitled "MULTIPLE TRADE MATCHING ALGORITHMS," published as U.S. Patent Application Publication No. 2014/0006243 A1, incorporated by reference herein, discloses an adaptive match engine which draws upon different matching algorithms, e.g. the rules which dictate how a given order should be allocated among qualifying resting orders, depending upon market conditions, to improve the operation of the market. For example, for a financial product, such as a futures contract, having a future expiration date, the match engine may match incoming orders according to one algorithm when the remaining time to expiration is above a threshold, recognizing that during this portion of the life of the contract, the market for this product is likely to have high volatility. However, as the remaining time to expiration decreases, volatility may decrease. Accordingly, when the remaining time to expiration falls below the threshold, the match engine switches to a different match algorithm which may be designed to encourage trading relative to the declining trading volatility. Thereby, by conditionally switching among matching algorithms within the same financial product, as will be described, the disclosed match engine automatically adapts to the changing market conditions of a financial product, e.g. a limited life product, in a non-preferential manner, maintaining fair order allocation while improving market liquidity, e.g., over the life of the product.

In one implementation, this trading system may evaluate market conditions on a daily basis and, based thereon, change the matching algorithm between daily trading sessions, i.e. when the market is closed, such that when the market reopens, a new trading algorithm is in effect for the particular product. As will be described, the disclosed embodiments may facilitate more frequent changes to the matching algorithms so as to dynamically adapt to changing market conditions, e.g. intra-day changes, and even intra-order matching changes. It will be further appreciated that hybrid matching algorithms, which match part of an order using one algorithm and another part of the order using a different algorithm, may also be used.

With respect to incoming orders, some traders, such as automated and/or algorithmic traders, attempt to respond to market events, such as to capitalize upon a mispriced resting order or other market inefficiency, as quickly as possible. This may result in penalizing the trader who makes an errant trade, or whose underlying trading motivations have changed, and who cannot otherwise modify or cancel their order faster than other traders can submit trades there against. It may be considered that an electronic trading system that rewards the trader who submits their order first creates an incentive to either invest substantial capital in faster trading systems, participate in the market substantially to capitalize on opportunities (aggressor side/lower risk trading) as opposed to creating new opportunities (market making/higher risk trading), modify existing systems to streamline business logic at the cost of trade quality, or reduce one's activities and exposure in the market. The result may be a lesser quality market and/or reduced transaction volume, and corresponding thereto, reduced fees to the Exchange.

With respect to resting orders, allocation/matching suitable resting orders to match against an incoming order can be performed, as described above, in many different ways. Generally, it will be appreciated that allocation/matching algorithms are only needed when the incoming order quantity is less than the total quantity of the suitable resting orders as, only in this situation, is it necessary to decide which resting order(s) will not be fully satisfied, which trader(s) may not get their orders filled. It can be seen from the above descriptions of the matching/allocation algorithms that they fall generally into three categories: time priority/first-in-first-out ("FIFO"), pro rata, or a hybrid of FIFO and pro rata.

FIFO generally rewards the first trader to place an order at a particular price and maintains this reward indefinitely. So if a trader is the first to place an order at price X, no matter how long that order rests and no matter how many orders may follow at the same price, as soon as a suitable incoming order is received, that first trader may be matched first. This "first mover" system may commit other traders to positions in the queue after the first move traders. Furthermore, while it may be beneficial to give priority to a trader who is first to place an order at a given price because that trader is, in effect, taking a risk, the longer that the trader's order rests, the less beneficial it may be. For instance, it could deter other traders from adding liquidity to the marketplace at that price because they know the first mover (and potentially others) already occupies the front of the queue.

With a pro rata allocation, incoming orders are effectively split among suitable resting orders. This provides a sense of fairness in that everyone may get some of their order filled. However, a trader who took a risk by being first to place an order (a "market turning" order) at a price may end up having to share an incoming order with a much later submitted order. Furthermore, as a pro rata allocation distributes the incoming order according to a proportion based on the resting order quantities, traders may place orders for large quantities, which they are willing to trade but may not necessarily want to trade, in order to increase the proportion of an incoming order that they may receive. This results in an escalation of quantities on the order book and exposes a trader to a risk that someone may trade against one of these orders and subject the trader to a larger trade than they intended. In the typical case, once an incoming order is allocated against these large resting orders, the traders subsequently cancel the remaining resting quantity which may frustrate other traders. Accordingly, as FIFO and pro rata both have benefits and problems, Exchanges may try to use hybrid allocation/matching algorithms which attempt to balance these benefits and problems by combining FIFO and pro rata in some manner. However, hybrid systems define conditions or fixed rules to determine when FIFO should be used and when pro rata should be used. For example, a fixed percentage of an incoming order may be allocated using a FIFO mechanism with the remainder being allocated pro rata. The hybrid system discussed above switches between FIFO and pro rata based on a condition of the market.

The exchange computer system 100 may be implemented with one or more mainframe, desktop or other computers, such as the example computer 200 described below with respect to FIG. 5. A user database 102 may be provided which includes information identifying traders and other users of exchange computer system 100, such as account numbers or identifiers, usernames and passwords. The exchange computer system 100 further includes various modules which may be implemented as individual components, e.g. hardware and/or software components, interconnected via an internal network or bus or common processing architecture (not shown) and may include an account data module 104 which may process account information that may be used during trades. A match engine module 106 may be included to match bid and offer prices and may be implemented with software that executes one or more algorithms for matching bids and offers. A match engine module/match engine/match processor 106 may be a hardware matching processor which is part of a transaction processing system. A data transaction processing system in which data items are transacted by a hardware matching processor that matches electronic data transaction request messages for the same one of the data items based on multiple transaction parameters from different client computers over a data communication network. A trade database 108 may be included to store information identifying trades and descriptions of trades. In particular, a trade database may store information identifying the time that a trade took place and the contract price. An order book module 110 may be included to compute or otherwise determine current bid and offer prices, e.g., in a continuous auction market, or also operate as an order accumulation buffer for a batch auction market.

A market data module 112 may be included to collect market data and prepare the data for transmission to users. A risk management module 134 may be included to compute and determine a user's risk utilization in relation to the user's defined risk thresholds. The risk management module 134 may define one or more constraints based on the user's risk requirements. These requirements may be set by a third party external to the Exchange Computer System 100, but also may be set by the Exchange Computer System 100.

The polytope module 142 may define a constraint polytope based on the risk requirements received from the risk management module 134. The polytope module 143 projects a set of data points representing transactions for the user to the constraint polytope to determine whether the set of points represent a solution to the constraint polytope for the risk requirements. As described in examples described herein, a dynamic matrix is adjusted based on the projection and applied to a subsequent iteration for a different set of points. This process is repeated according to solution requirements that require less than a perfect solution for the constraint polytope.

The position adjustment module 136 calculates one or more position adjustments or transactions based on the set of points for the solution that meets the solution requirements. The position adjustments may be based on positions associated with the user at the Exchange Computer System 100.

The message module 140 is configured to generate one or more messages in response to the position adjustments from the position adjustment module. The messages may be notifications that are sent to the user regarding one or more transactions needed to meet the risk requirements. The messages may include initiation message that are sent for processing by the order book module 110 and/or match engine module 106 to cause the transactions to be performed. That is, the transactions may be performed automatically in order to meet the risk requirements. The message may include the one or more transactions for the solution to the constraint polytope to one or more external devices. The messages may be margin requirement messages that describe a reduction in a margin requirement achieved based on the one or more transactions.

In an embodiment, the message module 140, as coupled with the order book module 110, may be configured for receiving a plurality of electronic messages, each of the plurality of messages having an associated action to be executed within a designated period of time having a beginning time and an ending time, wherein at least one electronic message of the plurality of electronic messages comprises data representative of a particular time between the beginning and end of the period of time at which the action associated with the at least one electronic message is to be executed. The exchange computer system 100 may then be further configured to execute the action associated with the at least one temporally specific message at the particular time.

One skilled in the art will appreciate that one or more modules described herein may be implemented using, among other things, a tangible computer-readable medium comprising computer-executable instructions (e.g., executable software code). Alternatively, modules may be implemented as software code, firmware code, hardware, and/or a combination of the aforementioned. For example, the modules may be embodied as part of an Exchange Computer System 100 for financial instruments.

The trading network environment shown in FIG. 10 includes exemplary computer devices 114, 116, 118, 120 and 122 which depict different exemplary methods or media by which a computer device may be coupled with the Exchange Computer System 100 or by which a user may communicate, e.g., send and receive, trade or other information therewith. It should be appreciated that the types of computer devices deployed by traders and the methods and media by which they communicate with the Exchange Computer System 100 is implementation dependent and may vary and that not all of the depicted computer devices and/or means/media of communication may be used and that other computer devices and/or means/media of communications, now available or later developed may be used. Each computer device, which may comprise a computer 200 described in more detail below with respect to FIG. 11, may include a central processor that controls the overall operation of the computer and a system bus that connects the central processor to one or more conventional components, such as a network card or modem. Each computer device may also include a variety of interface units and drives for reading and writing data or files and communicating with other computer devices and with the Exchange Computer System 100. Depending on the type of computer device, a user can interact with the computer with a keyboard, pointing device, microphone, pen device or other input device now available or later developed.

An exemplary computer device 114 is shown directly connected to exchange computer system 100, such as via a T1 line, a common local area network (LAN) or other wired and/or wireless medium for connecting computer devices, such as the network 220 shown in FIG. 11 and described below with respect thereto. The exemplary computer device 114 is further shown connected to a radio 132. The user of radio 132, which may include a cellular telephone, smart phone, or other wireless proprietary and/or non-proprietary device, may be a trader or exchange employee. The radio user may transmit orders or other information to the exemplary computer device 114 or a user thereof. The user of the exemplary computer device 114, or the exemplary computer device 114 alone and/or autonomously, may then transmit the trade or other information to the Exchange Computer System 100.

Exemplary computer devices 116 and 118 are coupled with a local area network ("LAN") 124 which may be configured in one or more of the well-known LAN topologies, e.g., star, daisy chain, etc., and may use a variety of different protocols, such as Ethernet, TCP/IP, etc. The exemplary computer devices 116 and 118 may communicate with each other and with other computer and other devices which are coupled with the LAN 124. Computer and other devices may be coupled with the LAN 124 via twisted pair wires, coaxial cable, fiber optics or other wired or wireless media. As shown in FIG. 4, an exemplary wireless personal digital assistant device ("PDA") 122, such as a mobile telephone, tablet based computer device, or other wireless device, may communicate with the LAN 124 and/or the Internet 126 via radio waves, such as via Wi-Fi, Bluetooth® and/or a cellular telephone based data communications protocol. PDA 122 may also communicate with exchange computer system 100 via a conventional wireless hub 128.

FIG. 10 also shows the LAN 124 coupled with a wide area network ("WAN") 126 which may be comprised of one or more public or private wired or wireless networks. In one embodiment, the WAN 126 includes the Internet 126. The LAN 124 may include a router to connect LAN 124 to the Internet 126. Exemplary computer device 120 is shown coupled directly to the Internet 126, such as via a modem, DSL line, satellite dish or any other device for connecting a computer device to the Internet 126 via a service provider therefore as is known. LAN 124 and/or WAN 126 may be the same as the network 220 shown in FIG. 5 and described below with respect thereto.

As was described above, the users of the Exchange Computer System 100 may include one or more market makers 130 which may maintain a market by providing constant bid and offer prices for a derivative or security to the Exchange Computer System 100, such as via one of the exemplary computer devices depicted. The exchange computer system 100 may also exchange information with other match or trade engines, such as trade engine 138. One skilled in the art will appreciate that numerous additional computers and systems may be coupled to exchange computer system 100. Such computers and systems may include clearing, regulatory and fee systems.

The operations of computer devices and systems shown in FIG. 10 may be controlled by computer-executable instructions stored on a non-transitory computer-readable medium. For example, the exemplary computer device 116 may store computer-executable instructions for receiving order information from a user, transmitting that order information to exchange computer system 100 in electronic messages, extracting the order information from the electronic messages, executing actions relating to the messages, and/or calculating values from characteristics of the extracted order to facilitate matching orders and executing trades. In another example, the exemplary computer device 118 may include computer-executable instructions for receiving market data from exchange computer system 100 and displaying that information to a user. In another example, the exemplary computer device 118 may include a non-transitory computer-readable medium that stores instructions for predicting and/or publishing a current response time or current match engine latency as described herein.

Of course, numerous additional servers, computers, handheld devices, personal digital assistants, telephones and other devices may also be connected to exchange computer system 100. Moreover, one skilled in the art will appreciate that the topology shown in FIG. 4 is merely an example and that the components shown in FIG. 4 may include other components not shown and be connected by numerous alternative topologies.

As shown in FIG. 10, the Exchange Computer System 100 includes a message module 140 which may implement, in conjunction with the market data module 112, the disclosed mechanisms for initiating electronic messages containing financial data sent between an exchange and a plurality of market participants, or vice versa. However, as was discussed above, the disclosed mechanisms may be implemented at any logical and/or physical point(s) through which the relevant message traffic, and responses thereto, flows or is otherwise accessible, including one or more gateway devices, modems, the computers or terminals of one or more traders, etc.

Figure 11:
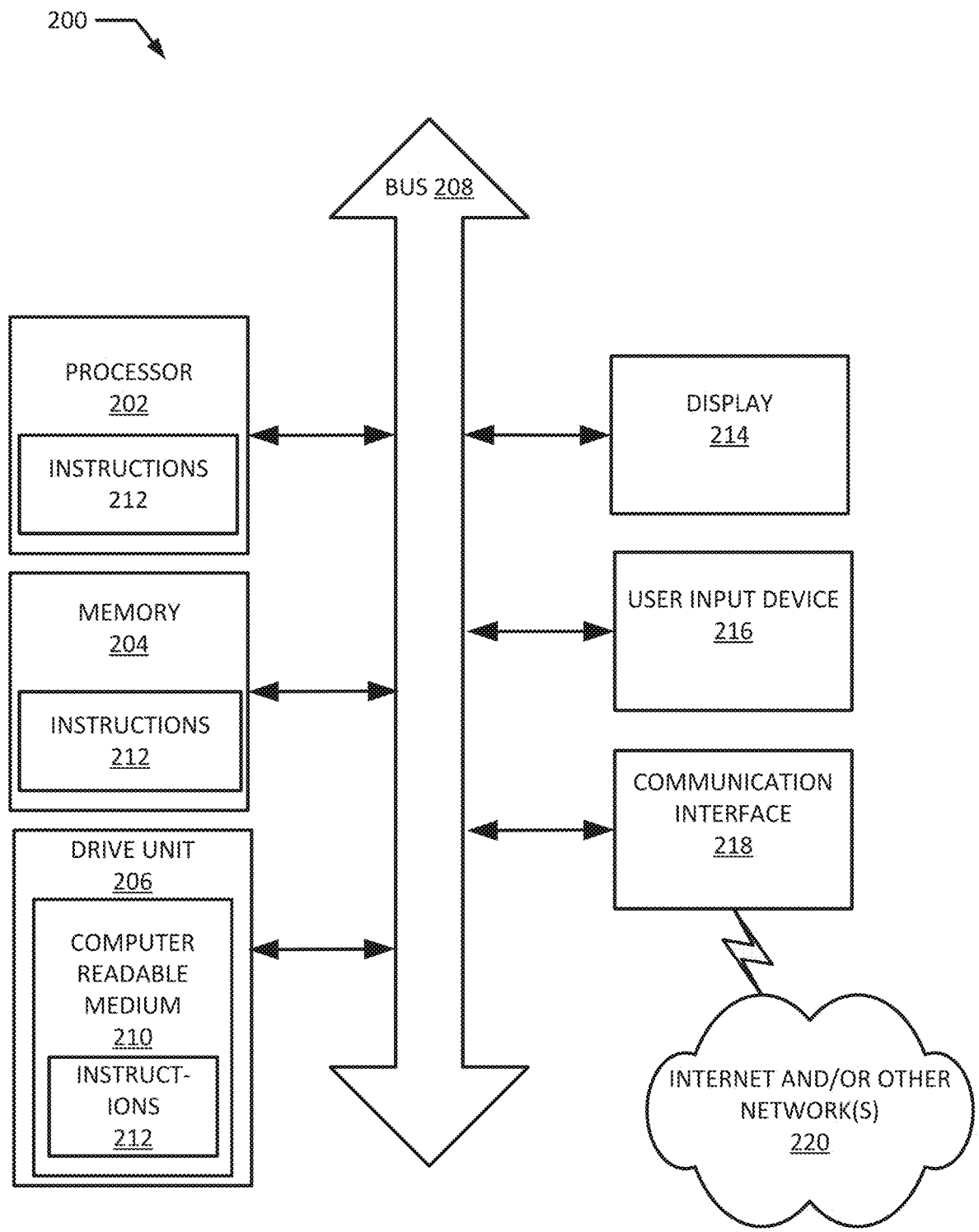
FIG. 11 depicts an illustrative embodiment of a general computer system for use with the disclosed embodiments.

Referring to FIG. 11, an illustrative embodiment of a general computer system 200 is shown. The computer system 200 can include a set of instructions that can be executed to cause the computer system 200 to perform any one or more of the methods or computer based functions disclosed herein. The computer system 200 may operate as a standalone device or may be connected, e.g., using a network, to other computer systems or peripheral devices. Any of the components discussed above, such as the processor 202, may be a computer system 200 or a component in the computer system 200. The computer system 200 may implement a match engine, margin processing, payment or clearing function on behalf of an exchange, such as the Chicago Mercantile Exchange, of which the disclosed embodiments are a component thereof.

In a networked deployment, the computer system 200 may operate in the capacity of a server or as a client user computer in a client-server user network environment, or as a peer computer system in a peer-to-peer (or distributed) network environment. The computer system 200 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 200 can be implemented using electronic devices that provide voice, video or data communication. Further, while a single computer system 200 is illustrated, the term "system" shall also be taken to include any collection of systems or sub-systems that individually or jointly execute a set, or multiple sets, of instructions to perform one or more computer functions.

As illustrated in FIG. 11, the computer system 200 may include a processor 202, e.g., a central processing unit (CPU), a graphics processing unit (GPU), or both. The processor 202 may be a component in a variety of systems. For example, the processor 202 may be part of a standard personal computer or a workstation. The processor 202 may be one or more general processors, digital signal processors, application specific integrated circuits, field programmable gate arrays, servers, networks, digital circuits, analog circuits, combinations thereof, or other now known or later developed devices for analyzing and processing data. The processor 202 may implement a software program, such as code generated manually (i.e., programmed).

The computer system 200 may include a memory 204 that can communicate via a bus 208. The memory 204 may be a main memory, a static memory, or a dynamic memory. The memory 204 may include, but is not limited to, computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 204 includes a cache or random access memory for the processor 202. In alternative embodiments, the memory 204 is separate from the processor 202, such as a cache memory of a processor, the system memory, or other memory. The memory 204 may be an external storage device or database for storing data. Examples include a hard drive, compact disc ("CD"), digital video disc ("DVD"), memory card, memory stick, floppy disk, universal serial bus ("USB") memory device, or any other device operative to store data. The memory 204 is operable to store instructions executable by the processor 202. The functions, acts or tasks illustrated in the figures or described herein may be performed by the programmed processor 202 executing the instructions 212 stored in the memory 204. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 200 may further include a display unit 214, such as a liquid crystal display (LCD), an organic light emitting diode (OLED), a flat panel display, a solid-state display, a cathode ray tube (CRT), a projector, a printer or other now known or later developed display device for outputting determined information. The display 214 may act as an interface for the user to see the functioning of the processor 202, or specifically as an interface with the software stored in the memory 204 or in the drive unit 206.

Additionally, the computer system 200 may include an input device 216 configured to allow a user to interact with any of the components of system 200. The input device 216 may be a number pad, a keyboard, or a cursor control device, such as a mouse, or a joystick, touch screen display, remote control or any other device operative to interact with the system 200.

In a particular embodiment, as depicted in FIG. 11, the computer system 200 may also include a disk or optical drive unit 206. The computer system 200 may implement any of the embodiments described herein. The disk drive unit 206 may include a computer-readable medium 210 in which one or more sets of instructions 212, e.g., software, can be embedded. Further, the instructions 212 may embody one or more of the methods or logic as described herein. In a particular embodiment, the instructions 212 may reside completely, or at least partially, within the memory 204 and/or within the processor 202 during execution by the computer system 200. The memory 204 and the processor 202 also may include computer-readable media as discussed above.

The present disclosure contemplates a computer-readable medium that includes instructions 212 or receives and executes instructions 212 responsive to a propagated signal, so that a device connected to a network 220 can communicate voice, video, audio, images or any other data over the network 220. Further, the instructions 212 may be transmitted or received over the network 220 via a communication interface 218. The communication interface 218 may be a part of the processor 202 or may be a separate component. The communication interface 218 may be created in software or may be a physical connection in hardware. The communication interface 218 is configured to connect with a network 220, external media, the display 214, or any other components in system 200, or combinations thereof. The connection with the network 220 may be a physical connection, such as a wired Ethernet connection or may be established wirelessly as discussed below. Likewise, the additional connections with other components of the system 200 may be physical connections or may be established wirelessly.

The network 220 may include wired networks, wireless networks, or combinations thereof. The wireless network may be a cellular telephone network, an 802.11, 802.16, 802.20, or WiMAX network. Further, the network 220 may be a public network, such as the Internet, a private network, such as an intranet, or combinations thereof, and may utilize a variety of networking protocols now available or later developed including, but not limited to, TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor may receive instructions and data from a read only memory or a random access memory or both. The essential elements of a computer are a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well. Feedback provided to the user can be any form of sensory feedback, e.g., visual feedback, auditory feedback, or tactile feedback. Input from the user can be received in any form, including acoustic, speech, or tactile input.

Embodiments of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The memory 204 may also include a database comprising data indicative of a constraint polytope. The memory 204 may include matrices defining inequalities for the constraint polytope. Each row may define a particular inequality and have a number of elements equivalent to the number of dimensions in the inequality and/or the constraint polytope.

The communication interface 218 is configured to receive a first point batch from an external computer system. The first point batch includes a plurality of data points representing transactions. The transactions may be potential trades between two or more entities. The trade may alter a risk or a position for a portfolio for the entities.

The processor 202 is an example polytope controller configured to analyze the plurality of data points and perform a projection attempt of the plurality of data points to the constraint polytope and generate a dynamic adjustment for a second point batch for the constraint polytope in response to the projection attempt. The dynamic adjustment may include a vector having one or more values for each dimension of the constraint polytope and/or corresponding to each inequality of the constraint polytope. The processor 202 is configured to analyze the second point batch in response to the dynamic adjustment to identify one or more transactions as a solution for the constraint polytope. Additional adjustments are determined and additional point batches may be analyzed until the solution requirements are met or until an iteration limit is reached.

The user input device 216 is configured to receive at least one user selected fail rate threshold, feasibility tolerance, or other solution requirements followed by the polytope controller in performing the projection attempt of the data points on the constraint polytope. The user input device 216 may receive a user input for the iteration limit, which may be a quantity of iteration or a computation time limit for the iterations.

The communication interface 218 is further configured to send a message including the identified one or more transactions for the solution to the constraint polytope to one or more external devices.

The display 214 is configured to present data indicative of the projection attempt. The data indicative of the projection attempt may include a listing of the inequalities in the constraint polytope are met by the one or more transactions determined by the polytope controller. The data indicative of the projection attempt may include the proportion or a number of the inequalities in the constraint polytope are met by the one or more transactions determined by the polytope controller. The data indicative of the projection attempt may include a listing of the transactions needed for the determined solution. The data indicative of the projection attempt may include a value for a margin requirement reduction associated with the determined solution.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A method for calculation of an estimation solution satisfaction of a constraint polytope, the method comprising:
    initializing, at a polytope controller, the constraint polytope;
    receiving, at the polytope controller, a first point batch from an external computer system, the first point batch including a plurality of data points representing transactions;
    in lieu of an individualized determination of projections specific to each of the plurality of data points, determining a uniform instruction set to perform on the first point batch to perform a plurality of projections in parallel of the plurality of data points to the constraint polytope, the uniform instruction set having a higher projection failure rate than the individualized determination of projections specific to each of the plurality of data points;
    iteratively performing, in parallel and at a graphics processing unit of the polytope controller, the uniform instruction set on each point of the first point batch until a target portion of the first point batch satisfies the constraint polytope to increase throughput by accepting imperfection in projection precision using an architecture of the graphics processing unit specialized for scalability;
    wherein a time complexity of at least one projection of the plurality of projections is proportionate to a number of inequalities of the constraint polytope after initialization;
    generating, at the polytope controller, a dynamic adjustment for use with a second point batch for the constraint polytope, wherein the dynamic adjustment includes a vector having a plurality of values representing a modification of the transactions of the first point batch; and
    determining, in response to the dynamic adjustment, a set of values defining a reduction in a margin requirement for the first point batch representing transactions.

2. The method of claim 1, wherein initializing the batch iteration for the constraint polytope comprises:
    generating at least one internal structure for the constraint polytope.

3. The method of claim 2, wherein the at least one internal structure includes a linear inequality.

4. The method of claim 1, wherein initializing the batch iteration for the constraint polytope comprises:
    defining default values for an adaptive mechanism.

5. The method of claim 1, wherein initializing the batch iteration for the constraint polytope comprises:
determining an acceptable fail rate for a proportion of the plurality of data points projected within the constraint polytope.

6. The method of claim 1, wherein initializing the batch iteration for the constraint polytope comprises:
determining a feasibility tolerance for a quantity of the plurality of data points that exceeds an inequality of the constraint polytope.

7. The method of claim 1, further comprising:
receiving the second point batch including a second plurality of data points;
analyzing the second plurality of data points;
performing a second projection of the second plurality of data points to the constraint polytope;
determining whether the second projection satisfies the constraint polytope; and
generating a second dynamic adjustment for use with a third point batch for the constraint polytope.

8. The method of claim 1, wherein a time complexity for the projection of a batch approximates $O(n)$.

9. The method of claim 1, wherein a time complexity for the projection is less than a time complexity for a quadratic optimization projection to the constraint polytope.

10. The method of claim 1, wherein a time complexity for the initialization of the constraint polytope is $O(mn^2)$ or $O(n^3)$.

11. An apparatus for calculation of an estimation solution within a constraint polytope, the apparatus comprising:
a database comprising data indicative of a constraint polytope;
a communication interface configured to receive a point batch from an external computer system, the point batch including a plurality of data points representing transactions; and
a polytope controller configured to determine, in lieu of an individualized determination of projections specific to each of the plurality of data points, a uniform instruction set to perform on the first point batch to perform a plurality of projections in parallel of the plurality of data points to the constraint polytope, the uniform instruction set having a higher projection failure rate than the individualized determination of projections specific to each of the plurality of data points;
the polytope controller including a graphics processing unit configured to:
iteratively perform, in parallel, the uniform instruction set on each point of the first point batch until a target portion of the first point batch satisfies the constraint polytope to increase throughput by accepting imperfection in projection precision using an architecture of the graphics processing unit specialized for scalability; and
generate a dynamic adjustment for use with at least one subsequent point batch for the constraint polytope in response to a projection attempt, wherein a time complexity of the projection attempt is proportionate to a number of inequalities of the constraint polytope, wherein the dynamic adjustment includes a vector having a plurality of values representing a modification of the transactions of the first point batch, the polytope controller further configured to calculate a reduction for a margin requirement, based on the dynamic adjustment, for the first point batch representing transactions.

12. The apparatus of claim 11, further comprising:
a user input device configured to receive at least one user selection for a fail rate threshold or a feasibility tolerance.

13. The apparatus of claim 12, wherein the fail rate threshold defines a limit for a proportion of the plurality of data points projected within the constraint polytope.

14. The apparatus of claim 12, wherein the feasibility tolerance defines a limit for a quantity of the plurality of data points that exceeds an inequality of the constraint polytope.

15. The apparatus of claim 11, further comprising:
a display configured to present data indicative of the projection attempt.

16. The apparatus of claim 11, wherein the polytope controller is configured to analyze the at least one subsequent point batch in response to the dynamic adjustment to identify one or more transactions as a solution within the constraint polytope.

17. The apparatus of claim 16, wherein the communication interface is further configured to send a message including the identified one or more transactions for the solution to the constraint polytope to one or more external devices.

18. A non-transitory computer readable medium including instructions that when executed are configured to:
initialize, at a polytope controller, a constraint polytope;
receive, at the polytope controller, a first point batch from an external computer system, the first point batch including a plurality of data points representing transactions;
in lieu of an individualized determination of projections specific to each of the plurality of data points, determine a uniform instruction set to perform on the first point batch to perform a plurality of projections in parallel of the plurality of data points to the constraint polytope, the uniform instruction set having a higher projection failure rate than the individualized determination of projections specific to each of the plurality of data points;
iteratively perform, in parallel and at a graphics processor of the polytope controller, the uniform instruction on each point in the first point batch until a target portion of the first point batch satisfies the constraint polytope to increase throughput by accepting imperfection in projection precision using an architecture of the graphics processing unit specialized for scalability of uniform instruction processing on multiple data points in parallel,
wherein a time complexity of the plurality of projections is proportionate to a number of inequalities of the constraint polytope;
generate, at the polytope controller, a dynamic adjustment for use with a second point batch for the constraint polytope, wherein the dynamic adjustment includes a vector having a plurality of values representing a modification of the transactions of the first point batch; and
determine, in response to the dynamic adjustment, a set of values defining a reduction for a margin requirement for the first point batch representing transactions.

* * * * *